United States Patent
Burns et al.

(10) Patent No.: US 11,084,966 B2
(45) Date of Patent: Aug. 10, 2021

(54) CONTROLLED RELEASE SYSTEM FOR THE RELEASE OF OIL FIELD CHEMICALS AND USE OF THE SYSTEM FOR RESERVOIR TREATMENT AND MONITORING

(71) Applicant: JOHNSON MATTHEY PUBLIC LIMITED COMPANY, London (GB)

(72) Inventors: Thomas William Burns, Cleveland (GB); Paul Finbar Quigley, Cleveland (GB); Chun-tian Zhao, Cleveland (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/569,986

(22) PCT Filed: Apr. 26, 2016

(86) PCT No.: PCT/GB2016/051174
§ 371 (c)(1),
(2) Date: Oct. 27, 2017

(87) PCT Pub. No.: WO2016/174415
PCT Pub. Date: Nov. 3, 2016

(65) Prior Publication Data
US 2018/0155597 A1   Jun. 7, 2018

(30) Foreign Application Priority Data

Apr. 30, 2015 (GB) ........................ 1507483
Sep. 10, 2015 (GB) ........................ 1516064

(51) Int. Cl.
*C09K 8/03* (2006.01)
*C09K 8/58* (2006.01)
(Continued)

(52) U.S. Cl.
CPC .............. *C09K 8/03* (2013.01); *C09K 8/58* (2013.01); *C09K 8/685* (2013.01); *C09K 8/70* (2013.01);
(Continued)

(58) Field of Classification Search
CPC .. C09K 8/92; C09K 2208/08; C09K 2208/10; E21B 47/1015; Y10S 507/902
See application file for complete search history.

(56) References Cited

U.S. PATENT DOCUMENTS 4,637,990 A    1/1987  Torobin
5,628,813 A *  5/1997  Chen .................... C05G 3/0029
                                                    71/64.02
(Continued)

FOREIGN PATENT DOCUMENTS

GB        2518057 A       3/2015
WO     WO2001081914     11/2001
(Continued)

OTHER PUBLICATIONS

PCT/GB2016/051174, International Search Report and Written Opinion dated Aug. 12, 2016.
GB1507483.4, Search Report under Section17(5) dated Jul. 10, 2015.

*Primary Examiner* — Aiqun Li
(74) *Attorney, Agent, or Firm* — BakerHostetler

(57) ABSTRACT

Compositions having a core and a coating that covers at least part of the core, where the core comprises a mixture of at least one oil field chemical and at least one core matrix polymer are described. The composition provides a slower release of an oil field chemical into an eluent compared to the release provide by the core. The compositions provide for the controlled release of tracer over long periods of time than is provided by the release from the core. Methods of making the compositions and systems containing the com-
(Continued)

positions are described. Methods of tracing the movement of fluid in a hydrocarbon reservoir using the compositions and methods of releasing biocides and other well treatment agents into reservoir fluids over time are also described.

18 Claims, 6 Drawing Sheets

(51) Int. Cl.
*C09K 8/68* (2006.01)
*C09K 8/70* (2006.01)
*C09K 8/88* (2006.01)
*C09K 8/92* (2006.01)
*E21B 47/11* (2012.01)

(52) U.S. Cl.
CPC ............ *C09K 8/88* (2013.01); *C09K 8/92* (2013.01); *E21B 47/11* (2020.05); *C09K 2208/08* (2013.01); *C09K 2208/10* (2013.01); *C09K 2208/20* (2013.01); *C09K 2208/22* (2013.01); *C09K 2208/32* (2013.01)

(56) References Cited

U.S. PATENT DOCUMENTS

| | | |
|---|---|---|
| 5,892,147 A | 4/1999 | Games et al. |
| 6,632,527 B1 | 10/2003 | McDaniel et al. |
| 2004/0014607 A1* | 1/2004 | Sinclair .............. C09K 8/536 507/200 |
| 2006/0052251 A1 | 3/2006 | Anderson et al. |
| 2006/0223713 A1 | 10/2006 | Pakulski et al. |
| 2008/0230223 A1 | 9/2008 | McCrary et al. |
| 2008/0248974 A1* | 10/2008 | Chen .................. C09K 8/528 507/90 |
| 2009/0325823 A1 | 12/2009 | Pakulski et al. |
| 2010/0307744 A1* | 12/2010 | Cochet ............... C09K 8/536 166/250.12 |
| 2010/0307745 A1 | 12/2010 | Lafitte et al. |
| 2014/0083704 A1 | 3/2014 | Sangermano et al. |
| 2014/0262262 A1 | 9/2014 | Zheng et al. |

FOREIGN PATENT DOCUMENTS

| | | |
|---|---|---|
| WO | WO2010140032 A2 | 12/2010 |
| WO | WO2015023648 A1 | 2/2015 |
| WO | WO2015039032 A1 | 3/2015 |

* cited by examiner

CONTROLLED RELEASE SYSTEM FOR THE RELEASE OF OIL FIELD CHEMICALS AND USE OF THE SYSTEM FOR RESERVOIR TREATMENT AND MONITORING

CROSS-REFERENCE TO RELATED APPLICATIONS

This application is the National Stage of International Patent Application No. PCT/GB2016/051174 filed Apr. 26, 2016, which claims priority from Great Britain Patent Application No. 1507483.4 filed Apr. 30, 2015 and from Great Britain Patent Application No. 1516064.1 filed Sep. 10, 2015, the disclosures of each of which are incorporated herein by reference in their entireties for any and all purposes.

FIELD OF THE INVENTION

The invention relates to controlled release compositions comprising a core and a coating that covers at least part of the core, where the core comprises a mixture of at least one oil field chemical and at least one matrix and the composition provides a controlled release of the oil field chemical into a fluid simulating a hydrocarbon reservoir fluid or a hydrocarbon reservoir fluid, articles containing these compositions, methods of manufacturing the compositions and articles and methods of using such compositions and articles to detect the release of tracers and tracing the flow of fluids from a subterranean reservoir following various reservoir operations.

BACKGROUND OF THE INVENTION

It is well-known to deliver so-called oilfield chemicals to a hydrocarbon reservoir to bring about a variety of functions at various stages of hydrocarbon production. Methods for delivering oilfield chemicals to a reservoir include methods in which the chemical is made into the form of particles which are suspended in a fluid which is pumped down a wellbore to the reservoir.

Oilfield fluids (e.g., oil, gas, and water) are complex mixtures of aliphatic hydrocarbons, aromatics, heteroatomic molecules, anionic and cationic salts, acids, sands, silts, clays and a vast array of other components in various amounts. The nature of these fluids, combined with the severe conditions of heat, pressure and turbulence to which they are often subjected during retrieval, are contributory factors to paraffin deposition (including the precipitation of wax crystals), emulsification (both water-in-oil and oil-in-water), gas hydrate formation, corrosion and asphaltene precipitation in oil and/or gas production wells and surface equipment. This, in turn, decreases permeability of the subterranean formation, reduces well productivity and shortens the lifetime of production equipment. Often, in order to get rid of such unwanted deposits and precipitates from wells and equipment, it is necessary to stop the production and perform a cleaning operation which is both time-consuming and costly. Some treatments can be physical, such as using equipment such as a pipeline inspection gauge, whereas some are chemical based and involve introducing purposefully designed mixtures of compounds.

Examples of these oil field chemicals include scale inhibitor, hydrate inhibitor, corrosion inhibitors, biocides and wax and asphaltene control substances.

A further example of oil field chemicals are reagents used for monitoring the production of reservoir fluids from areas (zones) of the hydrocarbon reservoirs. These reagents are more commonly known as tracers. They can be broadly categorized into two distinct types; radioactive and chemical (non-radioactive) tracers. Tracers have been used extensively in the areas of oil and gas production and hydrology for decades. Non-radioactive chemical tracers offer distinct advantages over the use of radioactive tracers. For example, there are more unique chemical tracers than radioactive tracers and no downhole logging tools are required. Furthermore there are fewer environmental and safety concerns present.

Optimal oil production from the reservoir depends upon reliable knowledge of the characteristics of the reservoir. Traditional methods for reservoir monitoring include seismic log interpretation, well pressure testing, production fluid analysis, production history matching and interwell tracer techniques. Due to the complexity of the reservoir all available information can be valuable to give the operator the best possible knowledge about the dynamics in the reservoir. Enhanced oil recovery (EOR) is the use of a range of techniques to increase the amount of crude oil that can be extracted from an oil field. One common enhanced oil recovery process is water injection in dedicated injection wells. The water can travel in different layers and sweep different areas in the reservoir. Various types of injection pattern are often used, such as 5-spot, 7-spot, inverted 5-spot and a line drive. Monitoring the production of this water in different zones in the well is important in designing a production program that improves the sweep efficiency and thereby increases the oil recovery. Mixing of injection water (water purposely injected into the reservoir) and formation water (water naturally present in the formation) in the reservoir can cause supersaturated solutions that can lead to precipitation of particles (scale) in either the reservoir near-well zone or in the production tubing. By knowing which zones contribute to water production, action can be taken to reduce the effect of scaling and thereby maintain productivity. The principal method in determining which zones contribute to this water production is the use of tracer technology.

The use of tracers to obtain information about a hydrocarbon reservoir and/or about what is taking place therein has been practiced for several decades and has been described in numerous documents. Tracers have primarily been used to monitor fluid paths and velocities. More than one tracer substance can be used concurrently. For instance, U.S. Pat. No. 5,892,147 discloses a procedure in which different tracers are placed at respective locations along the length of a well penetrating a reservoir. The tracers are placed at these locations during completion of the well before production begins. The tracer at each location is either attached to a section of pipe before it is placed at that location or is delivered into the location while the casing is perforated at that location. When production begins, monitoring the proportions of the individual tracers in the oil or gas produced by the well permits calculation of the proportions of oil or gas being produced from different zones of the reservoir.

It is an important requirement of all oil field chemicals that they are delivered to the targeted locations in the hydrocarbon reservoir and released in a controlled manner. A well treatment agent should be delivered so that the minimum amount required to cause the desired effect is applied at the desired location. Similarly, a tracer should be delivered so that it can be reliably detected in produced fluids. Several methods are known in the art for introducing tracers and well treatment agents into production wells. One technique is to incorporate the oil field chemical into a carrier matrix and attach the matrix on the pipe during the well completion stage, before the well is produced. This system, which uses a tracer in a matrix, can be described as a non-coated system. When the fluid comes into contact with the non-coated system, the oil field chemical is released. The mechanism of this release can vary depending on the matrix used but is believed to proceed mainly by a dissolution process with a minimal release attributed to a diffusion process.

A principal disadvantage of using a non-coated system is the difficulty in releasing the oil field chemical in a controlled manner over a sustained period of time. Very often the initial rate of release is high with a large amount of the oil field chemical removed during the initial stages. As a result, the concentration of the oil field chemical in the fluid needs to be built up by shutting down production and allowing the concentration of the oil field chemical to build up to a measurable or effective concentration. Very often additional material is added during the completion stage to circumvent this. This practice is less practical, economical and environmentally friendly as sufficiently more of the treatment agent must be added than is required. Both of these processes are uneconomical and can result in lost production revenue due to down time or using more of the chemical than is required.

Another disadvantage of this non-coated system is that the daily release rate of the oil field chemical from the system can be highly variable and depend on the history of the system. When exposed to fluid the initial release rate can be high and when exposed to fluid for a long time the release rate can be over 50 times lower. During the initial stages there can be an overdosing of the oil field chemical into the fluid and in the final stages there is not a significant amount of the material to cause an effect or to be measured. This variation can cause other issues further along the production and does not guarantee a uniform dosage along the pipeline during the wells lifetime.

The release of a compound from a non-coated system is related to the structure and solubility of the compound in the fluid. Generally liquid based chemicals will release at a higher rate compared to solid chemicals as they are readily solubilized. Additionally, the incorporation of a liquid chemical can interfere with the overall strength or hardness of a non-coated material. For example, in a thermoset resin the addition of a chemical could have a similar effect to adding a non-reactive diluent. In this situation the hardness and glass transition temperature of the material will be diminished. For these reasons the application of liquid based oil field chemicals is limited to flood processes and usually involve shutting in of the well.

One of the most important issues is the release of oil field chemicals from a formulated system to the targeted fluid or targeted areas of the reservoir. While it is often a requirement for oil field chemicals to be released in a sustained manner, e.g. slowly so that treatment can be effective over long period of time (e.g., years), the release of the chemicals in current commercial practice is often too fast (less than 6 months) and not up to the needs of the industry. As a result, some oil field chemicals have to be repeatedly introduced into wells to ensure that the requisite level of the well treatment agent is continuously present in the well. The release of oil field chemicals, such as tracers, is often not controlled in current practice, causing significant variations in the concentration in fluid in the reservoir over time for a single tracer and between different tracers. Such issues often result in ineffective treatments or loss of monitoring of the reservoir, and results in lost production revenue due to down time and the costs of the additional materials that are used retreat the wells.

Accordingly, there remains a need in the art to control the release of oil field chemicals such that there is a uniform release of the chemical that can occur over a period of time from 9 months to the lifetime of the well. The present invention satisfies this need among others.

SUMMARY OF THE INVENTION

In the first aspect of the invention, a composition comprises: (a) a core and (b) a coating that covers at least part of the core, where the core comprises a mixture of at least one oil field chemical and at least one core matrix and the composition provides a controlled release of the oil field chemical into a fluid or gas that is less than a comparable composition not having a coating on the core, over a period of time under test conditions simulating an oil field reservoir using an eluent representative of fluid in a hydrocarbon reservoir at a temperature of at least 60° C.

In another aspect of the invention, methods of making a composition of the first aspect of the invention comprise: (a) forming a core comprising a mixture of at least one oil field chemical in a matrix, (b) applying a coating onto the core where the coating at least partially covers the core.

In still another aspect of the invention, a subterranean reservoir monitoring system comprises a composition of the first aspect of the invention and a means of obtaining a sample of a fluid from a hydrocarbon reservoir.

In yet another aspect of the invention, methods of determining the movement of a fluid or gas in a subterranean reservoir comprise the steps of placing within a well penetrating said reservoir a composition of the first aspect of the invention, thereafter collecting a sample of media being produced from the well and analysing said sample to determine the presence or absence of said at least one oil field chemical and optionally determining the concentration of one or more oil field chemicals in fluids flowing from the well.

In another aspect of the invention, methods of increasing the amount of oil field chemical which can be added to a defined volume in a subterranean reservoir comprising the steps of placing within a reservoir a composition of the first aspect of the invention.

In another aspect of the invention, a method of improving the stability of an oil field chemical within an unstable core matrix in a hydrocarbon reservoir comprises placing an oil field chemical into a core matrix that is unstable when placed directly into a subterranean reservoir, and applying a coating to the core to form a composition that is stable in a subterranean reservoir

BRIEF DESCRIPTION OF THE DRAWINGS

The invention may be understood from the following detailed description when read in connection with the accompanying drawings. The tracer in each figure can have a different chemical structure and are labeled as tracer A, B, C and D. But in all figures this is an oil based haloaromatic.

DETAILED DESCRIPTION OF THE INVENTION

Figure 1:
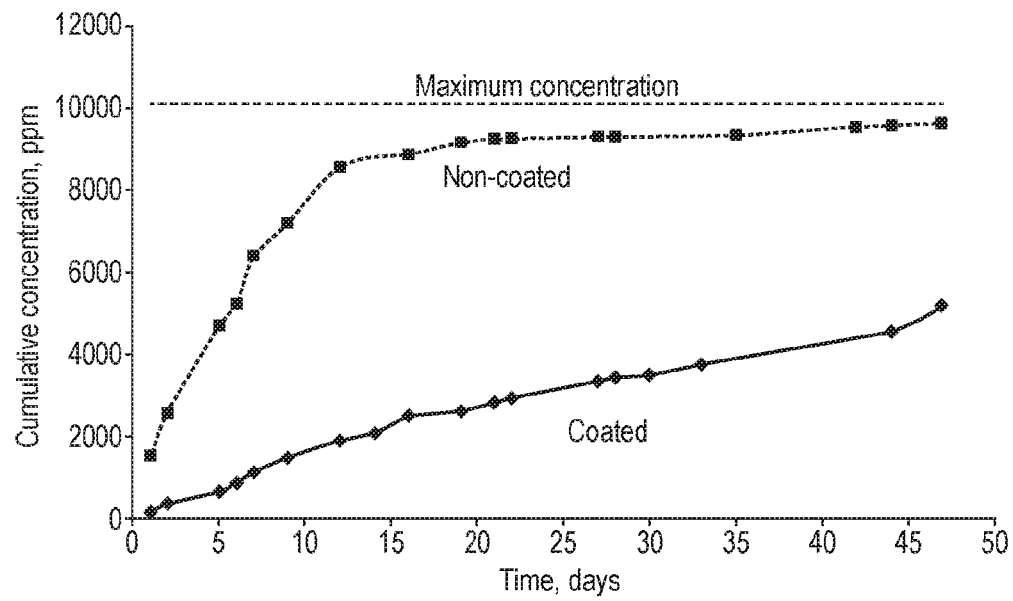
FIG. 1 is a graph showing the cumulative release of tracer A released from (i) a non-coated epoxy core in a cube shape (l=15 mm) and (ii) a similar epoxy core having an epoxy coating equating to 14.5% (w/w) of the total weight of the composition, in cyclohexane at 60° C. over 47 days. The theoretical maximum for the system is also shown and is based on a 45% (w/w) loading of the non-coated core.

The following definitions are provided in order to aid those skilled in the art in understanding the detailed description of the present invention.

As used in this specification and the appended claims, the singular forms "a", "an" and "the" include plural referents unless the context clearly indicates otherwise. Thus, for example, reference to "a matrix" includes a mixture of two or more matrices, unless specifically stated otherwise.

As used herein, the term "about" means approximately and refers to a range that is optionally ±25%, preferably ±10%, more preferably, ±5%, or most preferably ±1% of the value with which the term is associated.

When a range, or ranges, for various numerical elements are provided, the range, or ranges, can include the values, unless otherwise specified.

The term "hydrocarbon reservoir" or "reservoir" refers to a subterranean reservoir or formation which is manipulated, usually by drilling a borehole and placing a pipeline into the borehole, so as to extract oil and/or gas (usually with water) from the reservoir. The term includes reservoirs which are oil and/or gas producing.

The term "release" means a process where one or more oil field chemicals are introduced to a hydrocarbon reservoir or well in the form of a composition or an article described herein, and the one or more oil field chemicals move from the composition or article into one or more fluids in the reservoir. The term "release", when used in the context of laboratory testing, refers to the movement of one or more oil field chemicals from a composition or article into an eluent that is representative of a reservoir fluid.

The term "oil field chemical" means one or more compounds that can be released into a fluid from a subterranean hydrocarbon (oil or gas) reservoir or well for performing certain functions such as reservoir monitoring and well treatment. The term "oil field chemical" includes any class of chemical commonly used in an oil field, including tracers and well treatment agents, such as biocides.

"Wt %" refers to the weight of a component or ingredient relative to the total dry weight of a composition, e.g., weight percent. For example, a dosage form comprising 40 wt % of compound (1) and that weighs 1000 mg contains 400 mg of compound (1).

The term "release rate" refers to the rate at which a compound is released from a composition or article described herein. The rate can be based on the amount of compound in terms of gravimetric measurement or concentration in the eluent or fluid at the time of sampling. Daily release rate is the amount of oil field chemical, in percent of the applied dose or ng per g or parts per million (ppm) of composition or article, released in a 24 h period.

The term "cumulative % of the applied tracer (or tracers) released" refers to the total percentage of the initial amount of a tracer (or tracers) that was released from a composition over a specific period of time under specific test conditions.

The term "controlled release" means a process whereby one or more compounds are released from a composition or an article and move from the composition or article into one or more fluids into a hydrocarbon reservoir in an even manner such that an approximately equal amounts of tracer is released over given time frames, such as weeks or months. This can be shown, for example, from a graph of the either the % of the applied oil field chemical released over time or the cumulative % of the applied oil field chemical released over time, where the graph shows the concentrations are approximately linear over time. The release profile may not be linear over an entire test period and may contain an initial release that is at a higher rate than the majority of the release profile. It is possible for the release profile to have two or more linear areas depending upon length of time the release is evaluated, the number of samples taken and the times when the samples are taken. The examples below are generally non-optimized systems, where the release rates were determined using articles having some imperfections, such as the core not fully adhering to the core. Despite these systems not being optimized, the graphs showing the release profiles of tracer from the articles show a linear release over at least the major portion of the period evaluated.

The term "well treatment agent" refers to any of the various materials placed within a well or a hydrocarbon reservoir to address various undesired effects caused by scale formations, salt formations, paraffin deposition, emulsification (both water-in-oil and oil-in-water), gas hydrate formation, corrosion, asphaltene precipitation, and paraffin formation. Well treatment agents include biocides, scale inhibitors, hydrate and halite inhibitors, corrosion inhibitors, wax and asphaltene control substances, demulsifiers, gel breakers, drag reducers, salt inhibitors, gas hydrate inhibitors, oxygen scavengers, foaming agents, surfactants and well clean up substances (such as enzymes; organic molecules, acids, esters, and aliphatic compounds).

The term "tracer" means one or more compounds that can be used to track the movement of one or more fluids (oil, water or gas) in a hydrocarbon reservoir. The term "radioactive tracer" means a tracer which is radioactive. The term "chemical tracer" means a non-radioactive chemical compound that is used as a tracer. A tracer can include a DNA or RNA. A tracer can also include any nanoparticle or nanocomposite material.

The term "core" or "non-coated system" refers to a mixture of at least one oil field chemical and at least one matrix into which the at least one oil field chemical is mixed or incorporated.

A matrix is a material that either forms a structure that contains or encloses an oil field chemical or, when the material is a liquid, forms a dispersion of the oil field chemical in the liquid. There can be two types of matrix, a core matrix and a coating matrix. The term "core matrix" refers to one or more materials that can be combined with a well treatment agent to allow the formation of a solid or liquid article (a core) which can be applied during the completion stages in a hydrocarbon reservoir. The term "matrix" may also refer to another or similar matrix which can be applied to a core. The term "coating" or "coating matrix" refers to a matrix that at least partially surrounds a core. The coating matrix can be identical to the core matrix or not. The coating will usually have some chemical resistance properties and will provide better strength to the entire composition.

The term "additives" refers to any of the compounds or mixtures that can be introduced into a matrix to improve one or more properties of the composition. Additives can be released from the composition but they are not intended to be used as an oil field chemical. The term additives includes, but is not limited to: antimicrobials/biostabilizers, antioxidants, antistatic agents, biodegradable plasticizers, blowing agents, external lubricants, fillers/extenders, flame retardants, heat stabilizers, impact modifiers, lubricants, light stabilizers, pigments, plasticizers, process aids and reinforcements.

The term "initiators" or "hardeners" refers to one or more compounds that react with a monomer to form an intermediate compound capable of linking successively with other monomers to form a polymeric compound.

The term "catalyst" refers to one or more compounds that catalyze the reaction of monomers and/or an intermediate compound to form a polymer.

The term "eluent" refers to any fluid, whether stationary, stirred, or flowing, which contacts the composition or article and is capable of allowing the release of an oil field chemical contained within the composition or article.

The term "fluid" refers to any fluid or gas produced from a hydrocarbon reservoir and includes gas, oil, water and mixtures thereof.

The term "processability" describes the processing property of a formulation. "Processability" refers to the ability to formulate a matrix with other ingredients (e.g. an oil field chemical), process the ingredients and form the matrix into a pre-designed shape within a predetermined period of time. Thus, when a matrix is "processable" it can be formulated with other ingredients, processed and formed into predetermined shape. Conversely, when a matrix is "un-processable" it cannot be formulated with other ingredients, processed and formed into a pre-determined shape. When referring to a thermoset polymer, processability refers to the period of time as described by its pot-life.

The inventors have discovered that compositions and articles having the structures described herein provide a means for the even release of an oil field chemical under conditions simulating those found in hydrocarbon reservoirs for a period of at least one month and in some cases for over 3 months. By incorporating an oil field chemical into a matrix to form a core and then coating at least a portion of the core with a coating to form an article, the article provides for a much slower and more consistent release rate than is observed from a non-coated system.

To produce a non-coated article, an oilfield chemical is mixed with a matrix. An example of a matrix can be a thermoset polymer such as an epoxy resin, which has an epoxide and a hardening component. These materials when mixed together react to form a three-dimensional cross-linked structure. During the early stages of this reaction the epoxy resin can be transferred into moulded shapes and is said to be processable. As the reaction progresses the epoxy resin becomes more viscous to a point where the material cannot be transferred and becomes un-processable. The time from when the polymer is mixed to when it becomes un-processable is called the pot-life of the polymer. Sometimes this pot-life can be less than 30 minutes at room temperature and with heating or vigorous stirring this pot-life would be reduced further. An epoxy resin is provided as an example but this issue can apply to a number of other thermoset polymeric systems such as polyurethanes, vinyl esters, some unsaturated polyesters and some acrylic formulations.

When an oilfield chemical is added to an epoxy resin in a non-coated system, the resin is initially more viscous compared to when the oil field chemical is not present. In an attempt to achieve a homogeneous mixture of the oilfield chemical within the polymeric matrix, a mechanical shear mixer such as a Silverson mixer is often used. The use of a mixer can generate a large amount of heat, which can speed up the reaction between the epoxide and hardener components of the epoxy, thus further decreasing the pot-life of the polymer. These timing and heating restraints do not allow the oilfield chemical to be effectively mixed within the polymer matrix, as more vigorous stirring will result in the polymer/oil field chemical mixture becoming un-processable sooner and stirring time is already quite limited. In these systems it is therefore quite common that the oil field chemical will not be optimally dispersed for the above reasons.

Another barrier to achieving a homogenous mixture of oil field chemical in a matrix can be an uneven oil field chemical particle size or a broad distribution of particle sizes. This can result in varied release rates of an oil field chemical from the system, as obtaining a homogenous mixture from oilfield chemical particles of different sizes becomes almost impossible. This can contribute to uneven release of the oilfield chemical from compositions of the same batch.

Particle size may be made uniform by a milling procedure such that all particles of the oilfield chemical are below a certain size. During this procedure oilfield chemicals can be exposed to a large amount of heat generated by the procedure and therefore milling is limited to high temperature materials that do not undergo a phase change during the milling procedure. A physical sieve shaker could be used but is not really a scalable option and will greatly increase the time to make each composition.

During the curing procedure for epoxy resins, the non-coated pieces are cured in a mould at an elevated temperature. Often during this step the oilfield chemical can settle out towards the bottom of the non-coated piece. This can result in different rates of release of the oil field chemical from different faces of the non-coated polymer piece. This can be sometimes circumvented by using additives such as fumed silica. However, these additives can have an adverse effect on the rate of release of oilfield chemical and on the physical properties in some systems. Sometimes these additives cannot be always utilized due to processing concerns.

The release rate of an oil field chemical from a non-coated system is also dependent upon many variables including the structure of the oil field chemical and the properties of the matrix in which it is mixed. In most cases the initial release rate is very high, while near the end of the compositions lifetime the release rate is too low. A consequence of producing these non-coated systems is that any of the oilfield chemical at or near the surface of the system can be eluted quite easily into a medium representative of a reservoir fluid. Economical methods to reduce the amount of oil field chemical at the surface of the system during manufacture are not entirely obvious. Additionally the oilfield chemical release rate is often not uniform throughout the lifetime of the reservoir. This can result in the release of a compound from a non-coated system being unpredictable and uncontrollable. A high initial release rate can result in overdosing of the oil field chemical and rapid exhaustion of the release system, which in turn can result in the concentration of the oil field chemical in the eluent or fluid being too low to measure or to be effective. This release profile thus reduces the effective lifetime of non-coated systems.

In recent times, oil extraction companies require more detailed information about the reservoir to maximize oil and gas production. One example is the determination of how much oil (or water) has entered into a specific zone. Determining some of the processes occurring in the reservoir can be achieved using tracer technology. However, if the tracer release is variable then certain information can never be obtained. Non-coated systems also have quite short lifetimes.

Current strategies to prolong this lifetime include applying more of the non-coated systems during the well completion stage or shutting down production of the well to allow the buildup of the well treatment compound(s).

Another strategy involves adding the compound multiple times during the wells lifetime to achieve a consistent concentration. The compound can be added when the well is in operation or sometimes the well needs to be shut down to allow for additional tracer to be added. This is undesirable.

While the temperature and pressure in a single hydrocarbon reservoir do not usually vary significantly, these conditions can vary greatly across the world. Depending on how the well is completed, factors such as pH and viscosity of the fluid can vary. Thus being able to vary the release properties of an oil field chemical is highly desirable.

In a multi-stage reservoir tracking program where each stage uses a unique tracer, the ability of the system to release tracer over a long period is not the only important characteristic. To achieve the ideal oil field chemical release network, every oil field chemical should release at a similar rate when the flow of a reservoir fluid past each unique tracer location is equal. With the current non-coated system this is not the case and thus a correction factor must be incorporated into any reservoir modeling calculation. These correction factors are generated based on laboratory data again simulating reservoir conditions. This is not the ideal as any major deviation or unplanned event in a reservoir can have unique consequences to each non-coated tracer system. A multi-tracer system is quite common but if one or more well treatment agents have to be used in combination with each other, a non-coated system will struggle to provide equal release of the well treatment agent.

Manufacturing these non-coated systems is a relatively simple process. Unfortunately, the use of non-coated systems comes with the aforementioned issues. Undesirable release profiles with a large initial release, varied release profiles between different oil field chemicals, manufacturing and processing issues including non-homogeneous mixing of oil field chemical, uneven particle size, particle settling and easy dissolution of the surface material. Due to the relatively simple nature of the non-coated systems, any modification to resolve these issues must be a method that is economical, relatively quick and easy to complete in a reliable and robust manner.

Application of a coating layer onto a core is a facile and economical process. Due to the large range of coating matrices and coating thicknesses, the release properties of different oil field chemicals from articles with the same core matrix can be fine-tuned by the selection of an appropriate type and thickness for the coating.

The optimal coating must have a number of properties in relation to the core and the oilfield chemical to allow it to be used effectively.

The oil field chemical must be compatible with the core and the coating matrices. If the oil field chemical reacts or is unstable with either part of the composition then the composition cannot be utilized.

If the oil field chemical cannot diffuse through the core and the coating of the composition then the coating and core are deemed to be incompatible with each other. To ensure compatibility, the core and coating must bind or adhere to each other via some type of chemical bonding; otherwise, a non-bonded coating could be easily removed from the composition. Furthermore the material used for the core and coating of the composition must be selected to facilitate diffusion of the oilfield chemical into the reservoir. In reservoir applications there are many screens, ports and filtration processes working in tandem. If the coating lacks sufficient stability, physical and chemical strength, the structure of the composition could fail resulting in parts which could damage, block or obstruct any of the many openings in the pipeline. This would pose an enormous environmental and safety risk and the compositions would not be fit for the purpose for which they were designed. If the non-bonded coating is removed then the desired release properties of the coating will be lost.

In thermoset non-coated systems, during programs of extended curing, the polymer can shrink or expand depending on the presence of an oil field chemical, the level in which the oil field chemical is present and the type of matrix which is used. Any coating applied to this non-coated system can experience a similar effect. When applying a coating to a coated article shrinking and expansion has to be considered as cracking of the coating matrix of the article can be observed. This will have an effect on the release rate of the oil field chemical from the composition. In designing a composition, the thermal expansion properties of the core and coating matrices need to be considered; otherwise the composition will exhibit signs of cracking or breaking of the coating due to uneven thermal effects. This can result in the compositions performance being less predictable.

The use of a coating can also help to increase the strength or, if using a polymer, the glass transition temperature of the composition or article over that of a similar non-coated system. This is particularly evident when using liquid based oil field chemicals.

When an oil field chemical is incorporated into a thermoset polymer, it can affect properties of the polymer such as the glass transition temperature ($T_g$), which is determined using differential scanning calorimetry (DSC). Upon addition of an oil field chemical to a polymer the $T_g$ can decrease by up to 20%. This effect is due to the oil field chemical interfering with the cross-linking of the system thus reducing the $T_g$. The effect of $T_g$ on the release rate of a system has been investigated and appears to show that with increasing $T_g$ the release rate is decreased or the system releases the oil field chemical at a slower rate. Therefore in a coated system using the same thermoset resin in the core as for the coating, the $T_g$ of the coating will be higher when there is no oil field chemical in the coating. This will produce a slower rate of release which is highly desirable in the industry.

The coating can provide enhanced resistance of the article to bacterial growth or the development of mould. The coating can provide further protection of the article from chemical or water attack. This is important if the core is not chemically or physically resistant.

A chemical resistant and physically strong coating can allow the use of a less resistant or weaker core matrix. The usage of the weaker matrix would not allow application of the non-coated article to be effective.

The use of a coating over a core comprising an oil field chemical has not only been shown to reduce the compounds release rate from the composition, but the release rate has also been shown to be less variable when compared to a non-coated system. The release of an oil field chemical from an article having a coating over a core comprising an oil field chemical will depend on the type of coating applied and the amount of coating applied. For a given coating, the greater the amount of coating on the core, the lower the rate of release is expected. Different compounds can be released at different rates, but by selecting an appropriate coating the release rate can be modified so that each compound can release at the same rate.

The coating also provides a better release profile. The release of a compound from a composition can be achieved by a dissolution or diffusion process. When a core is formed, oil field chemicals at the edge/surface of the core can be very accessible and can be readily dissolved into the medium. When exposed to reservoir fluids, the oil field chemicals can be easily eluted from the surface in a similar manner to being in direct contact with the fluid. Diffusion based release is thought to be a very minimal at this stage. A coating layer provides a barrier that can prevent or minimize rapid oil field chemical loss by dissolution as the chemical will not be in direct contact.

The use of a coating matrix to circumvent the number of manufacturing and performance issues associated with non-coated systems and the enhanced properties a coating bestows onto the system are desirable attributes of the coating technology described herein. It is a need of the industry as it moves closer towards using computational reservoir modeling programs to determine how the reservoir is performing. This may be possible with a non-coated system; however the number of applicable oil field chemicals would be limited compared to those when used in a coated system, where a more uniform release rate of oilfield chemicals can be achieved.

The oil field chemical(s) will remain as a stable compound in the matrix of the core or coating. The oil field chemicals are not chemically bound by intermolecular forces such as ionic or covalent bonds to any other components of the composition.

The oil field chemical(s) will only enter reservoir fluid when the composition comes into contact with the reservoir fluid. Depending on the partition coefficient of the oil field chemical the chemical can enter the oil or water phase. Theoretically the oil field chemical will remain in the matrix throughout the lifetime of the composition until it comes into contact with the reservoir fluid into which it is soluble.

The oil field chemical(s) can be in a physical state of a solid, liquid or gas at the temperature of which the compounds are to be released. One of the advantages of the use of the compositions and articles described herein, is that liquid and/or solid oil field chemicals, including tracers and well treatment agents, can be incorporated into the compositions or articles described herein, and then delivered to the targeted hydrocarbon reservoir or well, where their release is much more controlled. In a composition without a coating, these liquid oil field chemicals will have a much high release rate and their usage would be less favorable.

In the compositions described herein, at least one oil field chemical is present within the core. The core can comprise two or more oil field chemicals. When one or more oil field chemicals are incorporated into the core of the composition, the one or more oil field chemicals can be mixed together or can be present in the core in discrete structures. When the core contains two or more oil field chemicals, all of the oil field chemicals can be oil soluble oil field chemicals, water soluble oil field chemicals or a mixture of water soluble and oil soluble oil field chemicals. The coating can comprise one or more oil field chemicals. The one or more oil field chemicals in the coating can be different than the one or more oil field chemicals in the core. The one or more oil field chemicals in the coating can be the same as the one or more oil field chemicals in the core. When the same oil field chemical is present in both the core and at least one coating and the core and coating matrices are identical, the loading of the oil field chemical in the core is at least twice the loading of the oil field chemical in all of the coatings. When two or more oil field chemicals are present in the composition, all of the oil field chemicals can be oil soluble oil field chemicals, all of the oil field chemicals can be water soluble oil field chemicals, or the oil field chemicals can be a mixture of oil soluble oil field chemicals and water soluble oil field chemicals. When two or more oil field chemicals are present in the composition, at least one of the oil field chemicals is present in a core.

Oil field chemical(s) can be present in the core or coating matrix in an encapsulated form, where the encapsulant can comprise any matrix that can encapsulate a tracer. Examples of such materials include, but are not limited to, melamine-formaldehyde, urea-formaldehyde, phenol-formaldehyde resin, melamine-phenol-formaldehyde resin, furan-formaldehyde resin, epoxy, a polypropylene-polyethylene copolymer, polyacrylates, polyesters, polyurethane, polyamides, polyethers, polyimides, polyether ether ketones, polyolefins, polystyrene and functionalized polystyrene.

Oil Field Chemicals in the Form of Nanoparticles or Microparticles

Nanoparticles or microparticles can be used as oil field chemicals or as composites of oil field chemicals. Upon their release into reservoir fluids they can form a colloidal suspension in the fluid. Examples include those based on a metal oxide core, where the metal can have various oxidation states or be a mixture of metals. The metal core can have an outer layer comprising a capping ligand, a polymer wrap, silica wrap or any other functionality to prevent agglomeration. This outer layer of the nanoparticle can have a detectable functionality to allow analysis.

Chemical Tracers

Any chemical compound can be used as a tracer with the present invention if it does not interfere or interact undesirably with other materials present in the oil well at the levels used. Preferably, before the tracer is added to the well, the tracer is not present at a measurable level in reservoir fluids from the well to be tested. This means that background levels of the tracer should be less than the limit of detection. It is also preferred that the tracer can be measured at levels sufficiently low to allow its use to be economical. While upper limits for the concentration of the tracer in reservoir fluid can be as high as about 10,000 parts per million, for a variety of reasons, such as economical, toxicological, causing unacceptable interactions with other materials present in an oil well, etc. the tracers can be detectable at a lower limit of about 50 parts per million, preferably about 1 ppm, more preferably about 100 parts per billion, even more preferably about 10 parts per billion. Depending upon the tracer selected and the analytical method used, the lower limit of detection can particularly be 1 part per billion, more particularly 100 parts per trillion, even more especially 10 parts per trillion, most especially 1 part per quadrillion in the fluid being analyzed. The tracer can be a radioactive tracer but preferably the tracer is not a radioactive tracer.

More than one tracer can be used to measure multiple operations in the same well. For example, oil wells often have more than one producing strata or zone. In the practice of the present invention, a fracture could be done on one stratum using a first tracer and a fracture could be done on another stratum using a second tracer. Horizontal drilling allows for the drilling of multiple bores terminating in a common bore that connects to the surface. In multilateral wells such as these, several different tracers could be used to keep track of concurrent recovery of materials from the several legs (lateral bores) of such wells.

The tracers can be present in the compositions in an amount from about 0.5% to 99% by weight of the total composition, preferably from about 2% to about 90% by weight of the total composition, more preferably from about 5% to about 50% by weight of the total composition. The tracer can be present at 2 to 90% by weight of the total core. Preferably the tracer is present at 5 to 80% w/w of the total core. The amount of tracer present in the compositions can be based upon the elution profile and the expected concentration in the reservoir fluid into which the tracer will move when eluted from the compositions. Concentrations of the tracer in the reservoir fluid can preferably be at least 10 times, preferably at least 100 times, the limit of detection, which depends upon the chemical and the analytical method(s) used.

Oil Soluble Tracers

Tracers used to track the movement of oil soluble materials generally have low water solubility and high (>1000) octanol/water partition coefficients. Several families of such compounds have been used. Illustrative examples of suitable tracer compounds of the present invention are organic compounds selected from the hydrocarbons and halogenated hydrocarbons. Mixtures of these compounds can also be used although single compounds are preferred. The tracer compound can preferably be a halogenated aromatic, polycyclic aromatic, heterocyclic aromatic, aromatic ketone, cycloalkane, or aliphatic compound, where the compound including at least one halogen selected from the group consisting of Br, Cl, F and I. Suitable tracers include, but are not limited to 4-iodotoluene, 1,4-dibromobenzene, 1-chloro-4-iodobenzene, 5-iodo-m-xylene, 4-iodo-o-xylene, 3,5-dibromotoluene, 1,4-diiodobenzene, 1,2-diiodobenzene, 2,4-dibromomesitylene, 2,4,6-tribromotoluene, 1-iodonaphthalene, 2-iodobiphenyl, 9-bromophenanthrene, 2-bromonaphthalene, bromocyclohexane, 1,2-dichlorobenzene, 1,3-dichlorobenzene, 1,4-dichlorobenzene, 1-bromododecane, bromooctane, 1-bromo-4-chlorobenzene, bromobenzene, 1,2,3-trichlorobenzene, 4-chlorobenzylchloride, 1-bromo-4-fluorobenzene, perfluoromethylcyclopentane (PMCP), perfluoromethylcyclohexane (PMCH), perfluorodimethylcyclobutane (PDMCB), m-perfluorodimethylcyclohexane (m-PDMCH), o-perfluorodimethylcyclohexane (o-PDMCH), p-Perfluorodimethylcyclohexane (p-PDMCH), perfluorotrimethylcyclohexane (PTMCH), perfluoroethylcyclohexane (PECH), and perfluoroisopropylcyclohexane (IPPCH).

Water Soluble Tracers

Water soluble tracers can be used to track the movement of production fluids containing water. Groups of compounds that are commonly described in the art as dyes, pigments, and colorants can be used. These compounds are often visible to the eye in either ambient or ultraviolet light. Suitable tracers useful with the present invention include but are not limited to those selected from the group consisting of: Acridine Orange; 2-anthracenesulfonic acid, sodium salt; Anthrasol Green IBA (Solubilized Vat Dye); bathophenanthrolinedisulfonic acid disodium salt; amino 2,5-benzene disulfonic acid; 2-(4-aminophenyl)-6-methylbenzothiazole; Brilliant Acid Yellow 8G (Lissamine Yellow FF, Acid Yellow 7); Celestine Blue; cresyl violet acetate; dibenzofuransulfonic acid, 1-isomer; dibenzofuransulfonic acid, 2-isomer; 1-ethylquinaldinium iodide; fluorescein; fluorescein, sodium salt (Acid Yellow 73, Uranine); Keyfluor White ST (Flu. Bright. 28); Keyfluor White CN; Leucophor BSB (Leucophor AP, Flu. Bright. 230); Leucophor BMB (Leucophor U, Flu. Bright. 290); Lucigenin (bis-N-methylacridinium nitrate); mono-, di-, or tri-sulfonated napthalenes, including but not limited to 1,5-naphthalenedisulfonic acid, disodium salt (hydrate) (1,5-NDSA hydrate); 2-amino-1-naphthalenesulfonic acid; 5-amino-2-naphthalenesulfonic acid; 4-amino-3-hydroxy-1-naphthalenesulfonic acid; 6-amino-4-hydroxy-2-naphthalenesulfonic acid; 7-amino-1,3-naphthalenedisulfonic acid, potassium salt; 4-amino-5-hydroxy-2,7-naphthalenedisulfonic acid; 5-dimethylamino-1-naphthalenesulfonic acid; 1-amino-4-naphthalene sulfonic acid; 1-amino-7-naphthalene sulfonic acid; and 2,6-naphthalenedicarboxylic acid, dipotassium salt; 3,4,9,10-perylenetetracarboxylic acid; Phorwite CL (Flu. Bright. 191); Phorwite BKL (Flu. Bright. 200); Phorwite BHC 766; Pylaklor White S-15A; 1,3,6,8-pyrenetetrasulfonic acid, tetrasodium salt; pyranine, (8-hydroxy-1,3,6-pyrenetrisulfonic acid, trisodium salt); quinoline; rhodalux; rhodamine WT; safranine O; sandoz CW (Flu. Bright, 235); Sandoz CD (Flu. Bright. 220); Sandoz TH-40; Sulforhodamine B (Acid Red 52); Tinopal 5BM-GX; Tinopol DCS; Tinopal CBS-X; Tinopal RBS 200; Titan Yellow (Thiazole Yellow G), and any existing ammonium, potassium and sodium salts thereof. Preferred fluorescent tracers include 1,3,6,8-pyrenetetrasulfonic acid, tetrasodium salt and 1,5-naphthalenedisulfonic acid, disodium salt (hydrate).

Preferably the chemical tracers useful with the present invention include, but are not limited to: halogenated benzoic acids, salts and compounds derived from the acid such that they hydrolyze to form the acids, or salts thereof, in the reservoir, including 2-fluorobenzoic acid; 3-fluorobenzoic acid; 4-fluorobenzoic acid; 3,5-difluorobenzoic acid; 3,4-difluorobenzoic acid; 2,6-difluorobenzoic acid; 2,5-difluorobenzoic acid; 2,3-difluorobenzoic acid; 2,4-difluorobenzoic acid; pentafluorobenzoic acid; 2,3,4,5-tetrafluorobenzoic acid; 4-(trifluoro-methyl)benzoic acid; 2-(trifluoromethyl)benzoic acid; 3-(trifluoro-methyl)benzoic acid; 3,4,5-trifluorobenzoic acid; 2,4,5-trifluorobenzoic acid; 2,3,4-trifluorobenzoic acid; 2,3,5-trifluorobenzoic acid; 2,3,6-trifluorobenzoic acid; 2,4,6-trifluorobenzoic acid and the brominated, chlorinated and iodinated analogs thereof. When more than one halogen atom is present on the benzoic acid, the halogens can be the same or different. Preferably, the salts of the halogenated benzoic acids are sodium salts or potassium salts.

Well Treating Agents

Numerous types of well treating agents are known in the art. Well treating agents are used to inhibit, control, prevent or treat various conditions that can affect the reservoir and the production of oil and/or gas from the reservoir. Well treating agents are general described in families based on what function they perform. The well treatment agent can be a biocide, a scale inhibitor, an asphaltene dispersant and inhibitor, an acid stimulation chemical, a sand control agent, an anti-fouling agent, a corrosion inhibitor, a gas hydrate control agent, wax (paraffin wax) control agent, a demulsifier, a foam control agent, a flocculant, a hydrogen sulfide scavenger, an oxygen scavenger, a drag-reducing agents (DRA's), a hydrotesting chemical or a foamer for gas well deliquification. In many cases, it would be helpful if well treating agents were able to be slowly released over time to help maintain the well treating agent at an effective concentration in the well or reservoir. Various types of well treating agents are described by Malcolm A. Kelland in Production Chemicals for the Oil and Gas Industry, Second Edition Hardcover, 16 Apr. 2014.

Biocides include oxidising biocides; non-oxidising organic biocides, such as aldehydes, quaternary phosphonium compounds, quaternary ammonium compounds, cationic polymers, organic bromides, metronidazole, isothiazolones (or isothiazolinones) and thiones, organic thiocyanates, phenolics, alkylamines, diamines and triamines, dithiocarbamates, 2-decylthioletanamine and hydrochloride salts, triazine derivatives, and oxazolidines); and biostats (control "biocides" or metabolic inhibitors), such as anthraquinone, nitrates and nitrites. Specific examples of biocides include acrolein, bronopol, 2,2-dibromo-3-nitrilopropionamide, formaldehyde, glutaraldehyde, tetrakishydroxymethyl phosphonium sulfate (THPS), $[NR_1R_2R_3R_4]^+Cl^-$ (where $R_1$=alkyl($C_{14}$-$C_{18}$) and $R_2$, $R_3$, and $R_4$=methyl or benzyl or $R_1$ and $R_2$=alkyl($C_{10}$) and $R_3$ and $R_4$=methyl), dibromonitrilopropioanamide (DBNPA), Dazomet (MITC), tributyl tetradecyl phosphonium chloride (TTPC), halogenated oxidizers, dithiocarbamate, methylene bisthiocyanate (MBT), didecylmethylquat, methylbenzylcocuat, cocodiamine diacetate, cocodiamine, and chlorine dioxide.

Scale inhibitors include polyphosphonates, phosphate esters, nonpolymeric phosphonates and aminophosphonates, polyphosphonates, phosphino polymers and polyphosphinates, polycarboxylates, biodegradable polycarboxylates and polysulfonates. Exemplary anionic scale inhibitors include strong acidic materials such as a phosphonic acid, a phosphoric acid or a phosphorous acid, phosphate esters, phosphonate/phosphonic acids, the various aminopoly carboxylic acids, chelating agents, and polymeric inhibitors and salts thereof. Included are organo phosphonates, organo phosphates and phosphate esters as well as the corresponding acids and salts thereof. Phosphonate/phosphonic acid type scale inhibitors are often preferred in light of their effectiveness to control scales at relatively low concentration. Polymeric scale inhibitors, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), are also effective scale inhibitors. Sodium salts are preferred.

Asphaltene dispersants and inhibitors include low molecular weight, nonpolymeric asphaltene dispersants, such as low-polarity nonpolymeric aromatic amphiphiles, sulfonic acid-base nonpolymeric surfactant asphaltene dispersants, nonpolymeric surfactant asphaltene dispersants with acidic head groups, amide and imide nonpolymeric surfactant asphaltene dispersants, and alkylphenols and related asphaltene dispersants; and oligomeric (resinous) and polymeric asphaltene dispersants, such as alkylphenol-aldehyde resin oligomers, polyester and polyamide/imide asphaltene dispersants and asphaltene dissolvers. Exemplary asphaltene treating chemicals include, but are not limited to, fatty ester homopolymers and copolymers (such as fatty esters of acrylic and methacrylic acid polymers and copolymers) and sorbitan monooleate.

Acid stimulation chemicals include corrosion inhibitors for acidizing, nitrogen based corrosion inhibitors, oxygen-containing corrosion inhibitors, including those with unsaturated linkages, corrosion inhibitors containing sulphur, ion control agents, water wetting agents, oil-wetting agents, weak organic acids, weak sandstone-acidizing fluorinated agents, buffered acids, gelled or viscous acids, foamed acids, temperature-sensitive acid-generating chemicals and enzymes and emulsified acids.

Sand control agents include resins and organosilanes.

Anti-fouling agents include naphthenate and other carboxylate anti-fouling agents.

Corrosion control agents include film-forming corrosion inhibitors (FFCI's) such as phosphate esters, amine salts of polycarboxylic acids, quaternary ammonium and iminium salts and zwitterionics, amidoimines and imidazolines, amides, polyhydroxy and ethoxylated amines/amides, nitrogen containing heterocycles, sulfur containing compounds and polyamino acids. Exemplary corrosion inhibitors include, but are not limited to, fatty imidazolines, alkyl pyridines, alkyl pyridine quaternaries, fatty amine quaternaries and phosphate salts of fatty imidazolines.

Gas hydrate control agents include thermodynamic hydrate inhibitors (THI's); kinetic hydrate inhibitors (KHI's), such as vinyl lactam KHI polymers, hyperbranched polyester amide KHI's, pyroglutamate KHI polymers and polydialkylmethacrylamide KHI's; anti-agglomerates (AA's), such as emulsion pipeline AA's, hydrate-philic pipeline AA's, natural surfactants and non-plugging oils, gas well AA's and gas hydrate plug removal agents. Exemplary gas hydrate control agents include, but are not limited to, polymers and homopolymers and copolymers of vinyl pyrrolidone, vinyl caprolactam and amine based hydrate inhibitors such as those disclosed in U.S. Patent Publication Nos. 2006/0223713 and 2009/0325823, both of which are herein incorporated by reference.

Wax (paraffin wax) control agents include wax solvents, thermochemical wax control packages, chemical wax prevention agents, such as wax inhibitors, ethylene polymers and copolymers, comb polymers (methacrylic ester polymers and maleic copolymers), wax dispersants and polar crude fraction flow improvers. Exemplary paraffin inhibitors useful for the practice of the present invention include, but are not limited to, ethylene/vinyl acetate copolymers, acrylates (such as polyacrylate esters and methacrylate esters of fatty alcohols), and olefin/maleic esters.

Demulsifiers include polyalkoxylate block copolymers and ester derivatives, alkylphenol-aldehyde resin alkoxylates, polyalkoxylates of polyols or glycidyl ethers, polyamine polyalkoxylates and related cationic polymers, polyurethanes (carbamates) and polyalkoxylate derivatives, hyperbranched polymers, vinyl polymers, polysilicones, dual-purpose demulsifiers and biodegradable demulsifiers. Exemplary demulsifying agents include, but are not limited to, condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of such di-functional products. Preferred non-ionic demulsifiers are oxyalkylated phenol formaldehyde resins, oxyalkylated amines and polyamines, di-epoxidized oxyalkylated polyethers, etc. Suitable oil-in-water demulsifiers include poly triethanolamine methyl chloride quaternary, melamine acid colloid, aminomethylated polyacrylamide etc.

Foam control agents include defoamers and antifoams, such as silicones and fluorosilicones, and polyglycols. Exemplary foaming agents include, but are not limited to, oxyalkylated sulfates or ethoxylated alcohol sulfates, or mixtures thereof.

Flocculants include cationic polymers such as dialkyldimethylammonium chloride polymers, acrylamide or acrylate-based cationic polymers; environmentally-friendly cationic polymeric flocculants; dithiocarbamates; anionic polymers and amphoteric polymers.

Hydrogen sulfide scavengers include non-regenerative $H_2S$ scavengers, such as solid scavengers, oxidising chemicals, aldehydes, reaction products of aldehydes and amines, such as triazines, and metal carboxylates and chelates.

Oxygen scavengers include dithionite salts, hydrazine and guanidine salts, hydroxylamines and oximes, activated aldehydes and polyhydroxyl compounds, catalytic hydrogenation agents, enzymes, sulfide iron reagents, bisulfite, metabisulfite and sulphate salts. Exemplary oxygen scavengers include triazines, maleimides, formaldehydes, amines, carboxamides, alkylcarboxyl-azo compounds cumine-peroxide compounds, morpholino and amino derivatives, morpholine and piperazine derivatives, amine oxides, alkanolamines, aliphatic and aromatic polyamines.

Drag-reducing agents (DRA's) include oil-soluble DRA's, such as polyalkene (polyolefin) DRA's and polymethacrylate ester DRA's, and water-soluble DRA's, such as polysaccharides and derivatives, polyethylene oxide DRA's, acrylamide-based DRA's and water-soluble surfactant DRA's. Exemplary surfactants include cationic, amphoteric, anionic and nonionic surfactants. Cationic surfactants include those containing a quaternary ammonium moiety (such as a linear quaternary amine, a benzyl quaternary amine or a quaternary ammonium halide), a quaternary sulfonium moiety or a quaternary phosphonium moiety or mixtures thereof. Suitable surfactants containing a quaternary group include quaternary ammonium halide or quaternary amine, such as quaternary ammonium chloride or a quaternary ammonium bromide. Included as amphoteric surfactants are glycinates, amphoacetates, propionates, betaines and mixtures thereof. The cationic or amphoteric surfactant can have a hydrophobic tail (which can be saturated or unsaturated) such as a $C_{12}$-$C_{18}$ carbon chain length. Further, the hydrophobic tail can be obtained from natural oil from plants such as one or more of coconut oil, rapeseed oil and palm oil. Preferred surfactants include N,N,N trimethyl-1-octadecammonium chloride, N,N,N trimethyl-1-hexadecammonium chloride; and N,N,N trimethyl-1-soyaammonium chloride, and mixtures thereof. Suitable anionic surfactants are sulfonates (like sodium xylene sulfonate and sodium naphthalene sulfonate), phosphonates, ethoxysulfates and mixtures thereof.

Hydrotesting chemicals include biocides, oxygen scavengers, corrosion inhibitors, dyes and environmentally friendly agents.

Foamers for gas well deliquification can also be used.

In the first aspect of the invention, a composition comprises: (a) a core and (b) a coating that covers at least part of the core, where the core comprises a mixture of at least one oil field chemical and at least one core matrix and the composition provides a controlled release of the oil field chemical into an eluent that is less than a comparable composition not having a coating on the core, over a period of at least 14 days under test conditions simulating an oil field reservoir using an eluent representative of fluid in a hydrocarbon reservoir at a temperature of at least 60° C. The composition can provide a release of the oil field chemical into an eluent that is less than a comparable composition not having a coating on the core, over a period of 3 months, preferably over a period of 6 months, more preferably over a period of 1 year, most preferably over a period of 2 years, under conditions simulating that found in a hydrocarbon reservoir.

Core Matrix

The core matrix is preferably a thermosetting polymer, a blend of a thermosetting polymer with one or more additional thermosetting polymers, a thermoplastic polymer, a blend of one or more thermoplastic polymers with one or more thermosetting polymers, an elastomer, a wax, a binding agent, a rubber or a natural polymer.

The thermosetting polymer can be an epoxy resin, a polyester resin (alkyd), a cross-linkable polymer, a cross-linkable polyolefin, an amino resin, a phenolic resin, a polyurethane, a crosslink-able acrylic polymer, a phenol-formaldehyde resin, a melamine resin, a urea-formaldehyde resin, a melamine-formaldehyde resin, a polyimide, a silicone resin, a cyanate ester (a polycyanurate) or a diallyl-phthalate (DAP).

The thermoplastic polymers can be a linear polyolefin (such as polypropylene (isotactic or syndotactic) or a polyethylene), a polyurethane, a polyester (polyethyleneterephthalate, polybutyleneterephthalate), a polyvinyldifluoroethylene, a polyamide, an acrylic polymer, a polyimide, a polystyrene, a polyvinyl chloride or a fluoropolymer.

The elastomer can be a non-oil-resistant rubber, an oil-resistant rubber or a thermoplastic elastomer.

The liquid can be a solvent which into which an oil field chemical can be fully or partially solubilized into such as toluene, acetone, benzyl alcohol, tetrahydrofuran, diethyl ether, water or brine.

A binding agent can be stearamide, a microcrystalline wax, polyvinylalcohol (PVA), polyvinylpyrrolidone (PVP) or gelatin.

The core matrix can comprise at least one of a product of the reaction of an epoxy with a hardener, an acrylate, a polyester, a polyolefin (linear and crosslinked) a polyurethane, polybutylene terephthalate (PBT), a polypropylene, a highly cross-linked polyethylene, a polyvinyl chloride (PVC), a nylon, polyvinylidene difluoride (PVDF), polytetrafluoroethylene (PTFE), a polyoxymethylene (POM), an acrylonitrile butadiene styrene (ABS), a polystyrene, a polycarbonate, polyethylene terephthalate (PET), a polychlorotrifluoroethene (PTFCE), a polysulfone, a polyimide, a polyamide, a melamine formaldehyde, a cyanoacrylate, polyphenylene sulfide (PPPS), polypropylene oxide, phenyl formaldehyde Bakelite, a polystyrene, a fluorinated ethylene propylene (FEP), a perfluoroalkoxy alkane (PFA), ethylene tetrafluoroethylene (ETFE), or a poly(fluoroethylene-vinyl ether) (PFEVE).

The core matrix used in the composition can be a commercially available polymer or can be formed by direct polymerization of monomers during manufacture of the compositions.

The core matrix can also contain, in addition to polymers, property modifying additives. The property modifying additives can be fillers/extenders, toughening agents, plasticisers, stabilisers, antimicrobials, etc. One type of preferred additive is inorganic nanoparticles such as fumed silica, aluminium oxide nanoparticles, nano clay (such as nano-bentonite) or precipitated calcium carbonate. Other types of preferred additives are carbon nanotubes and carbon fibers.

The Core

The core comprises a mixture of at least one oil field chemical incorporated into at least one matrix. The matrix of the core can comprise, but is not limited to, an injection moulded material, a cast moulded material, an extruded material, a solution, a thermoset polymer, a thermoplastic polymer, a binding agent or a wax. The matrix of the core can also be a synthetic organic material, a synthetic polymer, an inorganic material, a glass or mixtures thereof. The core can further comprise a carbon fiber and/or nano/micro particulates. The core can be formed from a plurality of shaped pieces. The shaped pieces can comprise fibers, microencapsulated material, or any of the above described material that can be in a core. The shaped pieces can be in the form of a cuboid, a ball, a cutting, a net, a block or a film.

The core can be formed into regular or irregular shaped object. Regular shaped objects can be rectangular, sheet, spherical bead, and cylindrical shape or block shape. Irregular shapes include chips, fibers, elliptical beads or nets. The core can have various shapes or orientations to vary the release profile of the oil field chemical. The core can be pre-formed or can be placed into a pre-formed mould of the coating matrix with a definite shape.

The core can comprise a first matrix and the coating can comprise a second matrix, where the first matrix is different from the second matrix. The core can comprise a first matrix and the coating can comprise a second matrix and the first matrix is the same as the second matrix. The coating can comprise one or more oil field chemicals that are different than the oil field chemicals in the core matrix.

The composition can further comprise one or more adhesive agents or binding agents. One or more adhesive agents or binding agents can be located in the core and/or between the core and the coating.

The amount of an oil field chemical in the core is between 0.01% and 99.9%, inclusive, preferably between 0.1% and 99%, inclusive, of the total weight of the composition, The amount of an oil field chemical in the core is greater than or equal to one or more of the following percentages based on the total weight of the composition: 5, 10, 15, 20, 25, 30, 35, 40, 45, 50, 55, 60, 65, 70, 75, 80, 85 or 90.

Coating

The coating can be a permeable or semi-permeable matrix that will allow the controlled release of the oil field chemical from the core or coating. The composition can comprise two or more coatings. Each coating comprises a coating matrix. The coating matrix can be a thermosetting polymer, a blend of thermosetting polymer with one or more additional thermosetting polymers, a thermoplastic polymer, a blend of one or more thermoplastic polymers with one or more thermosetting polymers, an elastomer, a rubber or a natural polymer. The thermosetting polymer can be an epoxy resin, a polyester resin (alkyd), a cross-linkable polymer, a cross-linkable polyolefin, an amino resin, a phenolic resin, a polyurethane, a crosslink-able acrylic polymer, a phenol-formaldehyde resin, a melamine resin, a urea-formaldehyde resin, a melamine-formaldehyde resin, a polyimide, a silicone resin, a cyanate ester (a polycyanurate) or a diallyl-phthalate (DAP). The thermoplastic polymer can be a linear polyolefin (preferably a polypropylene (isotactic or syndotactic) or a polyethylene), a polyurethane, a polyester (polyethyleneterephthalate, polybutyleneterephthalate), a polyvinyldifluoroethylene, a polyamide, an acrylic polymer, a polyimide, a polystyrene, a polyvinyl chloride or a fluoropolymer. The coating matrix can comprise, but is not limited to, at least one of a product of the reaction of an epoxy with a hardener, an acrylic polymer, a polyester, a polyolefin (linear or branched), a polyurethane, polybutylene terephthalate (PBT), a polypropylene, a polyethylene a polyvinyl chloride (PVC), a nylon, polyvinylidene difluoride (PVDF), polytetrafluoroethylene (PTFE), a polyamide, a polyoxymethylene (POM), an acrylonitrile butadiene styrene (ABS), a polystyrene, a polycarbonate, polyethylene terephthalate (PET), a polychlorotrifluoroethene (PTFCE), a polysulfone, a polyimide, a melamine formaldehyde, a cyanoacrylate, polyphenylene sulfide (PPPS), polypropylene oxide, phenyl formaldehyde Bakelite, a polystyrene, a fluorinated ethylene propylene (FEP), a perfluoroalkoxy alkane (PFA), ethylene tetrafluoroethylene (ETFE), or a poly(fluoroethylene-vinyl ether) (PFEVE), a silicone, a polyisoprene, a polychloroprene, a polyaryletherketone, a water-soluble polymer, a grease, a wax, a fluoropolymer, or a particle coating, using organic particles, inorganic particles, such as silica or calcium carbonate, or organic/inorganic hybrid materials, such as hybrid silica/polyamide materials.

The coating will at least partially cover the core. The coating can cover all of the surface area of the core or the coating can cover ≥10%, preferably ≥20%, more preferably ≥30%, even more preferably ≥40%, particularly ≥50%, more particularly ≥60%, even more particularly ≥70%, most particularly ≥80% and most preferably ≥90% of the surface area of the core.

In a composition of the invention, the coating matrix does not contain an oil field chemical. However, in another composition, the coating can contain one or more oil field chemicals incorporated into its matrix. The one or more oil field chemicals in the coating can be different to the one or more oil field chemicals in the core. If the one or more oil field chemicals of the core are identical to the one or more oil field chemicals of the coating, then the matrix of the core is preferably not identical to the matrix of the coating.

The coating matrix can account for 0.01-100% w/w of the coatings. Preferably, the coating matrix is in the range of 1-100% w/w of the coatings. If an oil field chemical is present in the coating then the oil field chemical will account for 1-99% w/w of the coating. The coating can have a mass of about 0.001% to about 50% of the total mass of the composition. Preferably the coating is present at from 0.2 to 95% by weight of the total composition.

The coating can further comprise carbon fibre and/or nano/micro particulates. The coatings can further comprise an adhesive agent and/or a property improving agent.

Adhesive agents can be any material compatible with the core matrix into which the core is formed that provides additional or improved adhesion between the matrices of the core and the coating. Examples are copolymers such as ethylene-maleic anhydride copolymers, oxidised polyethylene, oxidised polypropylene, acrylate-styrene copolymer. The core can further comprise one or more adhesive agents. The adhesive agents can be fumed silica, precipitated calcium carbonate or a polymeric compatibiliser/stabilizer, such as ethylene-acrylate copolymer, ethylene-methacrylate copolymer, ethylene-maleic anhydride copolymers, propylene-acrylate copolymer, propylene-methacrylate copolymers, oxidised polypropylene, oxidised polyethylene, propylene-ethylene oxide copolymers, styrene-acrylate copolymers, acrylonitrile-butadiene-styrene copolymers and other suitable copolymers.

The adhesive agents can be present at the surface of the core, between the core and the coating and/or in the coating.

Additives can be added to the coating to help it form or to identify the level of coating. Fumed silica or a fast acting hardener, such as DETA, are examples of additives that can aid forming of the coating. A dye or an optically active compound can help to monitor the level of coating.

Articles

The composition can be in the form of an article configured for placement in a hydrocarbon reservoir. The form can be in the shape of a rod, a bar, an oval, a cuboid, a strip, a strand, a tube, a disc, a button, a block, a cylinder, a flat piece, a net or a film. For example the article may be an elongate article, preferably having a substantially uniform cross-section. The cross-section is preferably rectangular. In some embodiments the cross-section may have generally the shape of a rectangle, but in which some or all of the sides have a concave or convex curve to them. The cross-sectional area is preferably in the range 4 $mm^2$ to 15000 $mm^2$, more preferably 4 $mm^2$ to 1000 $mm^2$, and yet more preferably 10 $mm^2$ to 300 $mm^2$. The area range may be between any two of the lower and upper limits. Such sizes may advantageously allow the articles to be inserted into the completion, for example in the drainage layer (that is, the region between the shroud and the base pipe). For example the articles may have a 2 mm×6 mm cross-section. The articles may, for example, have a length of greater than 150 mm, preferably a length of 300 mm or greater and more preferably of 400 mm or greater. In some embodiments the article may be up to and including 1000 mm in length. That may provide a balance between ease of handling and speed of deployment. The shape of the article can be modified to adjust the surface area of the articles that will be exposed to reservoir fluids. For example, a bar or strip can contain a series of V-shaped grooves. The articles can comprise a core comprising one or more oil field chemicals and one or more core matrix, where the core is covered by one or more coatings and the articles have a shape.

The articles can be formed by a one step or multi-step procedure. In a one-step procedure, the core and coating are formed concurrently. In a multi-step procedure, the core and coating are formed in separate steps.

The one-step procedure can be co-extrusion. A core matrix, an oil field chemical and additives are blended to form an extrudable core formulation. A coating polymer, additives and optionally an oil field chemical are mixed to form a coating formulation. The two formulations are extruded currently, but separately, using a co-extruded or double extruder so that when a core is formed, it is also coated. The shape of the article is determined by the die of the co-extruder.

In a multi-step procedure, the core and coating can be formed separately and combined sequentially. Preferably, a core matrix can be combined with an oil field chemical and added to a cylindrical tube of the coating matrix. The article then has a shape defined by the tube.

The core can be formed by any of a variety of known thermo forming or non-thermal forming processes including, but not limited to compounding, casting and moulding. Preferably, a core is formed by moulding such as injection moulding, including reaction injection moulding (RIM), which involves the rapid polymerisation of monomers/prepolymers with the oil field chemical incorporated into one of the components before mixing.

The core can be formed by combining at least one oil field chemical with a binding agent or a wax, by physically pressing a mixture of the two components into the desired shape.

A core can preferably by formed by extruding a formulation comprising one or more oil field chemicals and one or more core matrix materials through a single or twin screw compounder and/or extruder.

The desired shape of the core and the final composition/article can be formed through casting, moulding or extruding in the forming step. After formation, the core can also be processed through, for example polymer orientation techniques. The core may also be placed into a preformed mould of a coating matrix.

In a multi-step procedure, a coating can be applied sequentially after the core is formed. The coating can be applied to a core by painting, spray coating (both wet and dry techniques), spin coating, dipping, vacuum forming, roll-to-roll coating, solution casting, thermal casting, casting of mixtures and pre-polymer and curing agent followed by in situ polymerisation.

A coating can be manufactured in the form of film and the film can be applied to the core by shrink wrapping.

The coating can be a tube into which the core matrix with at least one oil field chemical is inserted.

In a multi-step procedure, a coating-core-coating structure, resembling a sandwich can be formed. A coating can be formed first and a separately formed core can be applied and adhered to the first coating. Then another coating can be formed on the top. Only two faces of the core can be coated.

The matrix in the core can have one or more chemical groups on its surface that are reactive towards the matrix in the coating, but not to the oil field chemical. The reactive groups can be, but not limited to, carboxylates, amines, anhydrides, hydroxyls, isocyanates, phosphates, nitriles, esters and aldehydes. During the process of adding the coating onto the core, reactions between the coating and core matrices, but not oil field chemicals, can occur. In the case of epoxide resins using an amine hardener the coating becomes incorporated/adheres to the core matrix through free amine and to a lesser extent hydroxyl groups.

As part of the coating formation process, the surface of the core can be treated with an adhesive agent or primer.

The compositions can be in the form of articles comprising polymer strips and oil field chemicals where the strips are coated with a polymer and the coated strips are placed inside well casings. The polymer strips can also be used in downhole applications (near well bore) to detect oil and water ingress.

The Process to Incorporate Oil Field Chemicals into the Core and Coating Matrices During manufacturing of the composition, there should not be any reactions that form chemical bonds between the oil field chemicals and any matrices used for the making of the composition/article. The oil field chemicals can be incorporated into the core matrix by physical mixing and blending. In this way reactions between the matrices and the oil field chemicals are not expected to occur.

The composition of the first aspect of the invention can be made by: (a) providing a core comprising a mixture of at least one oil field chemical in a matrix, (b) applying a coating onto the core where the coating at least partially covers the core. The step of providing the core can be performed by obtaining a core or by making or forming a core. The core can be formed by homogeneously mixing one or more oil field chemicals into a matrix. The core can be made by injection moulding, reactive injection moulding, casting, compounding or extrusion. The method can further comprise placing a coating comprising at least one adhesive agent on the core. The coating can be applied using techniques such as, but not limited to, painting, wet or dry spray-coating, dip-coating, shrink wrapping or extrusion. The coating can be pre-formed into a specific shape and the core can be moulded into the coating. The method can further comprise placing a second coating over the first coating, where at least one of the coatings comprises an adhesive agent. When the composition comprises an extruded core and an extruded coating and the step of applying a coating onto the core is performed co-extrusion with the core.

Oil field chemicals can be formed into articles comprising any of the matrices described above. Preferably the articles comprise matrices of a thermoset or thermoplastic polymer. Preferably the articles are in the shape of bars, blocks, strips, rods, an ellipsoid or a sphere. The shape of the article can be modified to adjust the surface area of the articles that will be exposed to reservoir fluids. For example, a bar or strip can contain a series of V-shaped grooves. The composition of the first aspect of the invention can comprise one or more modifications to the basic shape of the core or the overall composition such that the composition has an increased surface area relative to a similar composition without the one or more modifications. The core can be incorporated into a coating and shaped into an article.

Oil field chemicals are dispersed within the core and can also be present in one or more coatings surrounding the core. Particulate oil field chemicals can be pre-treated to have a desired range or distribution of particle sizes by milling or grinding. When oil field chemicals are placed in the coatings, the oil field chemicals can be mixed with one or more other components of the coating. Mixtures of different oil field chemicals can also be used.

Blending of the core, adhesive agents and/or compatibilizers and embedding polymers/pre-polymers and additives can be carried out by compounding/extrusion through a twin screw, a single screw compounder/extruder, a high speed dispersing equipment with a rotor, a rotating mixer, or other method known in the art.

The incorporation of an oil field chemical(s) into the matrix core can affect properties of the core material. In thermoplastic polymers and thermoset polymers, properties such as glass transition temperature, flexural strength and mechanical strength can be modified. In cases where the core and coating contain the same oil field chemical and the core and coating matrix are identical, the coating will have at least 50% (w/w) less loading of the oil field chemical than in the core. The coating material can confer additional strength to the article in addition to providing control of release. The combination of coating material and core material can provide a significant increase in temperature resistance to release.

Release of Oil Field Chemicals from Compositions and Articles

The various compositions and articles described herein provide different release rate profiles as shown below in the examples. While there is no industry accepted standard method for the conditions for testing release rates, those skilled in the art would recognize that typical dissolution type testing at elevated temperatures representing those found in a hydrocarbon reservoir using an eluent representative of oil can be used. Typical dissolution type testing involves suspending a material containing a compound of interest in an eluent with stirring, taking samples of the eluent at various times and determining the amount of the compound of interest that is present in the eluent over time. The system is partially open and eluent loss is minimal due to the high boiling point of the eluent. From this information, a graph of the cumulative amount of the compound of interest released over time is produced.

A typical test fluid containing 0-100% (more typically 10-30%, most preferably 15-25%) aromatic material can be used to simulate the typical aromatic content found in a range of crude oils. An example of a test fluid used 80% Transulate transformer oil (Smith & Allan) and 20% Downtherm Q oil (Dow Chemical) at 60° C.

In current products, the release of an oil field chemical is influenced by a combination of dissolution and diffusion and the initial release rate, per day, can be relatively high, compared to coated systems. Current (non-coated) systems suffer from a hysteresis effect as release rate is dependent on fluid exposure times, i.e. the longer that the system has been exposed to fluid the lower its release rate. Because of this, the ability to accurately measure information such as volume influx into the wellbore is greatly complicated. The invention does not suffer from this dependence on the systems history and, as provided in later examples, the release is more uniform. In non-coated articles, compounds can be released from the matrix through dissolution and/or a diffusion process. By contrast, in a coated system the effect of dissolution is greatly diminished and the release of tracer is in the main influenced by a diffusion process.

The compositions of the first aspect of the invention can provide release of the oil field chemical into the oil well fluids in a hydrocarbon reservoir such that measurable concentrations of the tracer or effective concentrations of the well treatment agent can be obtained for at least 14 days, at least 30 days, at least 3 months, at least 6 months, at least 9 months, at least 1 year, at least 15 months, at least 18 months, at least 21 months, at least 2 years, at least 27 months, at least 30 months, at least 33 months, at least 2 years and at least 5 years after the article has been placed in a hydrocarbon reservoir or in a system having an eluent and temperature simulating a hydrocarbon reservoir. The temperature used in simulation a hydrocarbon reservoir should be at least 60° C.

The compositions of the first aspect of the invention can provide a release of the oil field chemical into an eluent that is ≤80%, preferably ≤50%, more preferably ≤20, even more preferably ≤10%, than a comparable composition not having a coating on the core.

Use of Articles Providing a Controlled Release in Well Reservoirs

The compositions described herein have numerous applications in the area of detecting and tracking the movement of oil field fluids in a hydrocarbon reservoir. The compositions described herein also have numerous applications in the area of releasing well treating agents.

The compositions and articles described herein can be used in monitoring/tracking a flow of fluid from a hydrocarbon reservoir. A method of determining the movement of a fluid or gas in a subterranean reservoir comprising the steps of placing a composition of the first aspect of the invention within a well penetrating the reservoir, thereafter collecting a sample of the fluid or gas being produced from the well and analysing the sample to determine at least one of the presence or absence of the at least one oil field chemical and determining the concentration of one or more oil field chemicals in fluids flowing from the well. The method can further comprise taking a plurality of samples of fluid or gas flowing from the well over a period of time and determining the concentrations of one or more oil field chemicals in the fluid or gas over the period of time. The step of placing a composition of the first aspect of the invention within a well penetrating the reservoir comprises placing the composition of the first aspect of the invention within a fracture in a rock formation forming the reservoir, within a well completion apparatus installed within the well, or attached to a well completion apparatus installed within the well.

Methods used to monitor/track a flow of fluid from a hydrocarbon reservoir comprise the following steps: (a) placing a composition having a core comprising an oil field chemical and at least one core matrix, where the core is coated with a matrix that retards the release of the oil field chemical from the composition into the hydrocarbon reservoir and the composition is placed on, or in, pipes or fittings to be inserted into a well, to locations on a well, such as filters, casing near or part of the well bores, or within, or attached to, other well completion apparatus installed within the well, (b) collecting a sample of fluid flowing from the well and analysing the sample to determine the presence or absence of the at least one tracer and optionally determining the concentration of one or more tracers in fluids flowing from the well, (c) collecting and analysing a plurality of samples of fluids flowing from the well over a period of time and determining the concentrations of one or more tracers in the reservoir fluids, and (d) analysing the concentrations of the tracer to determine a pattern of back flow to obtain further reservoir flow information.

Another method of monitoring/tracking a flow of fluid from a hydrocarbon reservoir comprises the following steps: (a) applying a core matrix comprising at least one oil field chemical on, or in, pipes or fittings to be inserted into a well, at one or more locations of a well, such as filters, casing near or part of the well bores, or within, or attached to, other well completion apparatus installed within the well, (b) forming a coating on the shaped composition, where the coating can cover at least one face of the core matrix, (c) collecting a sample of fluid flowing from the well and analysing the sample to determine the presence or absence of the at least one tracer and optionally determining the concentration of one or more tracers in fluids flowing from the well, (d) collecting and analysing a plurality of samples of fluids flowing from the well over a period of time and determining the concentrations of one or more tracers in the reservoir fluids, and (e) analysing the concentrations of the tracer to determine a pattern of back flow to obtain further reservoir flow information.

A further method of monitoring/tracking a flow of fluid from a hydrocarbon reservoir comprises the following steps: (a) applying a coating matrix on, or in, pipes or fittings to be inserted into a well, at one or more locations of a well, such as filters, casing near or part of the well bores, or within, or attached to, other well completion apparatus installed within the well, (b) forming and placing a shaped composition containing a well treatment agent onto the first coating, (c) applying a second coating matrix onto the core formed, (d) collecting a sample of fluid flowing from the well and analysing the sample to determine the presence or absence of the at least one tracer and optionally determining the concentration of one or more tracers in fluids flowing from the well, (e) collecting and analysing a plurality of samples of fluids flowing from the well over a period of time and determining the concentrations of one or more tracers in the reservoir fluids, and (f) analysing the concentrations of the tracer to determine a pattern of back flow to obtain further reservoir flow information.

A method of increasing the amount of oil field chemical added to a defined volume in a subterranean reservoir comprises the step of placing within a reservoir a composition of the first aspect of the invention. The oil field chemical can be a well treatment agent and the composition can provide a release rate of the well treatment agent that allows for the well treatment agent to produce a desired effect caused by the presence of the well treatment agent for at least 14 days, preferably at least 30 days, more preferably at least 60 days.

A method of improving the stability of an oil field chemical within an unstable core matrix in a hydrocarbon reservoir, the method comprising placing an oil field chemical into a core matrix that is unstable when placed directly into a subterranean reservoir, and applying a coating to the core to form a composition that is stable in a subterranean reservoir.

Compositions with cores comprising oil field chemicals (i.e. tracers, biocides or other well treatment agents) can be used to place well treatment agents in reservoirs and/or well pipes and provide for the controlled release of well treatment agents over periods of time of at least 14 days, at least 30 days, at least 3 months, at least 6 months, at least 9 months, at least 1 year, at least 15 months, at least 18 months, at least 21 months, at least 2 years, at least 27 months, at least 30 months, at least 33 months, at least 2 years and at least 5 years after the article has been placed in a hydrocarbon reservoir or in a system having an eluent and temperature simulating a hydrocarbon reservoir.

The compositions and articles described above can comprise a single tracer, where the compositions and articles provide for at least two different release profiles of the tracer. Oil field chemicals can be located within the core and can also be present in one or more coatings surrounding the core. When the coating is identical to the core, there will either be no tracer in the coating, the tracer in the coating will be different to any tracer in the core, or the level of oil field chemical loading in coating will be at least 50% less than the loading in the core. Solid oil field chemicals can be pretreated to have a desired range or distribution of particle sizes by milling or grinding. Oil field chemicals can also be incorporated into mixtures of other chemicals such as solvents. When oil field chemicals are placed in the coatings, the oil field chemicals can be mixed with one or more other components of the coating. Mixtures of different tracers can also be used.

A subterranean reservoir monitoring system can comprise a composition of the first aspect of the invention and a means of obtaining a sample of a fluid from a hydrocarbon reservoir.

EXAMPLES

A haloaromatic tracer was used as the tracer in each of the examples below.

Example 1. Tracer A in an Epoxy Resin Coated with the Same Epoxy Resin

Tracer A (100 g) was sieved through a 1 µm sieve. 10 g of this material was mixed with 10 g of an epoxide component of bisphenol A diglycidyl ether (Sigma) in a plastic container and mixed with a wooden spatula. 2 g of triethylenetetramine (Sigma) was added to the tracer/epoxide mixture. The mixture was then poured into a cube shaped silicon mould (l=15 mm). The top of the cube was leveled using the wooden spatula so that the level of the resin was flush with the mould. This was then cured in an oven at 60° C. After 1 h the mould was removed, allowed to cool to room temperature and the cubes released from the mould. The cubes were not sticky and were hard to the touch.

A layer of epoxy coating was applied to the tracer/epoxy core prepared above. 1 g of triethylenetetramine (Sigma) was added to 5 g of bisphenol A diglycidyl ether (Sigma) at room temperature into a plastic container and mixed with a wooden spatula. After 15 minutes the mixture had become more viscous. Using a wooden spatula, the coating mixture was placed on each side of the cube. This coated cube was allowed to rest for 5 minutes. In order to make sure the cube was covered uniformly, the coating process was repeated 4 more times over 1 h. The coated cubes were placed in the oven at 60° C. and allowed to cure for a total of 2 h.

A non-coated epoxy cubic core (4.687 g) and an epoxy coated cubic core (5.483 g) were placed into individual bottles of cyclohexane (200 mL) and heated at 60° C. and magnetically stirred for 47 days. Samples of the cyclohexane were taken over time and analysed with an internal standard to determine the amount of tracer released into the cyclohexane.

Figure 2:
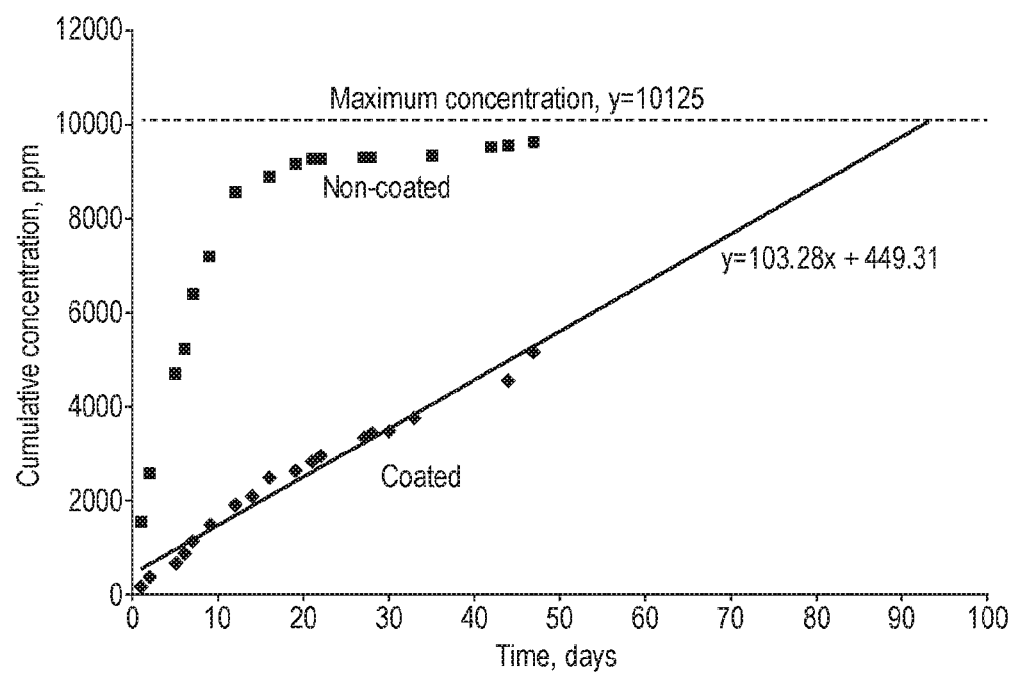
FIG. 2 is a graph showing the extrapolated cumulative release of tracer A released from the same coated non-coated epoxy systems from FIG. 1 and also showing the theoretical maximum time which the system can continue to release tracer. The theoretical maximum for this system is also shown and is based on a 45.45% (w/w) loading of the non-coated core.

FIG. 1 shows the release of tracer A from an epoxy coated core and a non-coated core. The non-coated core released about eight times the amount of tracer than was released from the coated tracer on the first day (1532 ppm versus 179 ppm). Over 63% of the total amount of tracer (6394 ppm) in the non-coated core was released by day 7, while less than 12% (1155 ppm) of the total amount of tracer A was released from the coated core. At day 16, over 87% of the total amount of tracer A (about 8885 ppm) in the non-coated core was released, while less than 26% (2621 ppm) of the total amount of tracer was released from the coated core. By day 28, the cumulative amount of tracer released from the non-coated core peaked at about 92% (9303 ppm) of the total amount applied to the core. However, the coated core released only about 34% (3444 ppm) of the total amount of tracer applied to the core. From about three weeks to about seven weeks, the cumulative amount of tracer released from the non-coated core increased slightly from about 92% to about 95% (9632 ppm), while the cumulative amount of tracer released from the coated core increased from about 34% to about 51% (5168 ppm). Extrapolation of the fit of the data from 47 days to 90 days (FIG. 2) indicates that, under the conditions of the test, the coated core would release the same amount of tracer over about 90 days as was released by the non-coated core over about 21 days. Therefore, the coated core provides for a longer release compared to the non-coated core, under the conditions of this test.

Example 2. Tracer B in a Nylon 12 and Fumed Silica Core Coated with Silicone 500 g of solid powder of an oil soluble tracer B were compounded with 2.0 kg of Nylon 12 (Rilsamid AESN O TL, Arkema) and extruded through a twin screw extruder (Prism TS24E, ThermoFisher) at 220° C. The extrudate was cooled with water and then pelletized. The pellets were then dried at 110° C. for 3 hours. The dried pellet materials were then injection moulded into pieces with dimensions of 125 mm long, 12.5 mm wide and 3.2 mm thick using an injection moulding machine (Boy 22S, BOYS Machines.) at 220° C.

A part of injection moulded piece made above (40 mm×5 mm×3.2 mm, 0.5598 g) was coated with silicone resin using a commercial silicon resin aerosol, LFCC (ex-Electrolube). The coating was sprayed on to each side of the piece until a visual even coating was observed. Each side was left to air dry for 30 min before applying a coating to the next side. Two coatings were applied to each side. Upon air drying of the second coating, the coated piece was placed in an oven at 60° C. to cure further. After 16 h, the piece was taken out of the oven and allowed to cool to room temperature. The coated piece was not sticky and was hard to touch.

Figure 3:
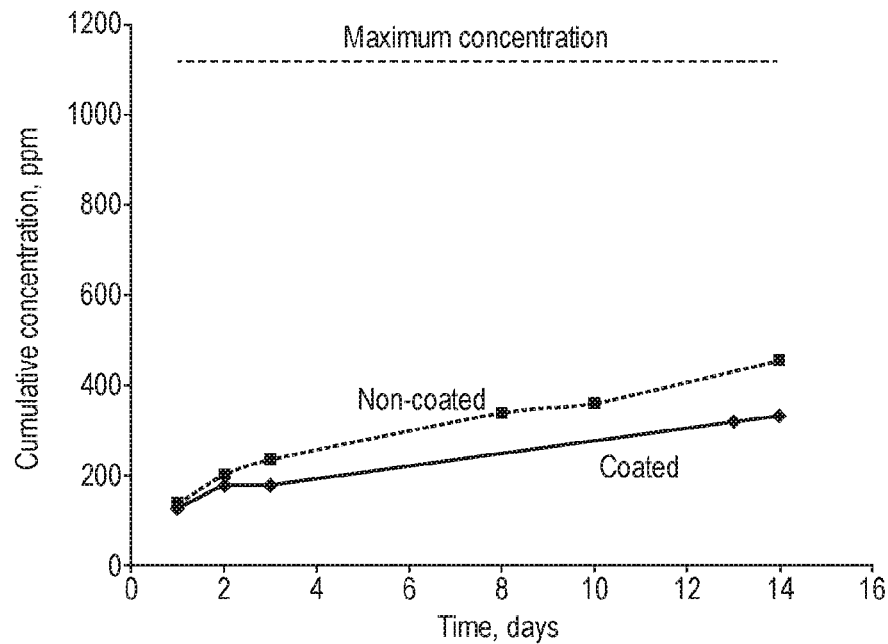
FIG. 3 is a graph showing the cumulative release of tracer B from (i) a non-coated core of an injection moulded piece having dimensions of 40 mm×5 mm×3.2 mm composed of nylon 12 with 2% fumed silica and (ii) a similar injection moulded core of nylon 12 with 2% fumed silica having a silicone spray coating, in synthetic oil at 60° C. for 14 days. The theoretical maximum for the system is also shown and is based on a 20% (w/w) loading of the non-coated core.

The coated piece (0.5933 g) and a non-coated piece (0.5598 g) were placed into individual bottles of synthetic oil (100 g) and heated at 60° C. Samples were shaken twice daily. Samples of the synthetic oil were taken over time and analysed with an internal standard to determine the amount of tracer released into the synthetic oil. FIG. 3 shows that the initial release on day 1 from both the coated and non-coated samples is comparable, with the coated system releasing 127 ppm and the non-coated system releasing 137 ppm. After the initial release, the release of the tracer from the coated sample was slower than that from the non-coated sample. For example, at day 3 the concentration of tracer in the synthetic oil from the coated and non-coated samples was 179 and 235 ppm, respectively. The release of tracer on day 3 from the coated sample was 76% of that from the non-coated sample. At day 14, the concentration of tracer in the synthetic oil from the coated and non-coated samples was 332 and 454 ppm, respectively. The release of tracer on day 14 from the coated sample was 75% of that from the non-coated sample.

Example 3. Tracer B in a Polybutylene Terephthalate (PBT) with Ethylene-Methacrylate Co-Polymer (EMA) Coated with a Silicone Resin 500 g of solid powder of an oil soluble tracer were compounded with 1.875 kg of polybutylene terephthalate (Amite T08 200, DSM) and 0.125 kg of ethyl methacrylate (Lotryl 20 MA08, Arkema). This was then extruded through a twin screw extruder (Prism TS24E, ThermoFisher) at 240° C. The extrudate was cooled with water and then pelletized. The pellets were then dried at 110° C. for 3 h. The dried pellet materials were then injection moulded into pieces with dimensions of 125 mm long, 12.5 mm wide and 3.2 mm thick using an injection moulding machine (Boy 22S, BOYS Machines.) at 240° C.

A part of injection moulded piece made above (40 mm×5 mm×3.2 mm, 0.6751 g) was coated with silicone resin. A commercial silicon resin aerosol LFCC (from Electrolube) was used for the coating. The coating was sprayed on to each side of the moulded piece until an even coating was visually observed. Each side was left to air dry for 30 minutes before applying a coating to the next side. Two coatings were applied to each side. Upon air drying of the second coating, the coated piece was placed in an oven at 60° C. for the final cure. After 16 h, the piece was taken out of the oven and allowed to cool to room temperature. The coated piece was not sticky and hard to the touch.

The coated piece (0.7101 g) and a non-coated piece (0.6751 g) were placed into individual containers of synthetic oil (100 g) and heated at 60° C. Samples were shaken twice daily. Samples of the synthetic oil were taken over time and analysed with an internal standard to determine the amount of tracer released into the synthetic oil.

Figure 4:
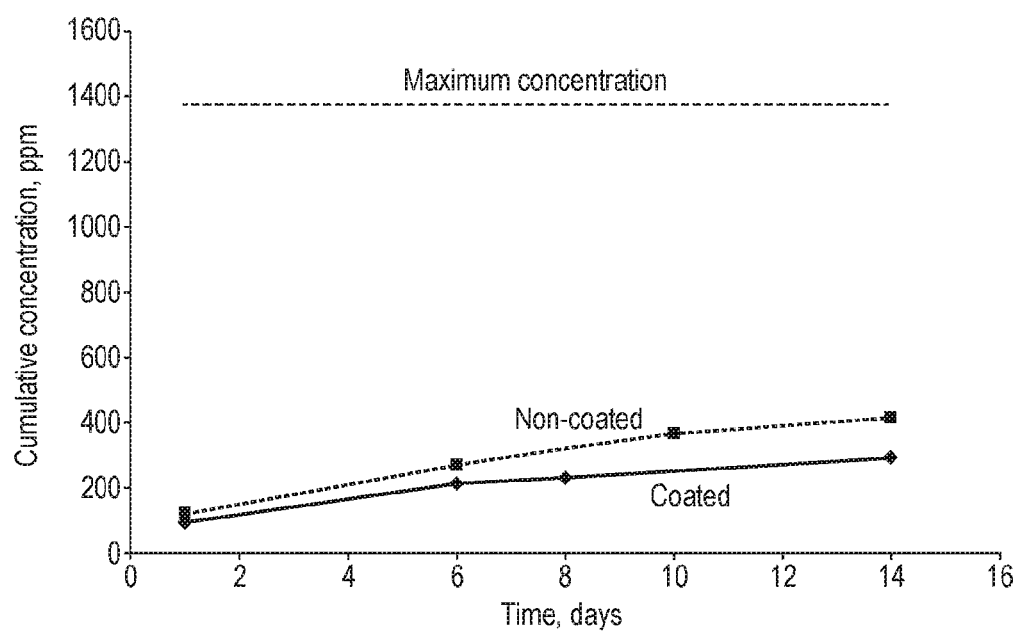
FIG. 4 is a graph showing the cumulative release of tracer B from (i) a non-coated core of an injection moulded piece having dimensions of 40 mm×5 mm×3.2 mm composed of polybutylene terephthalate (PBT) with 5% ethyl methacrylate (EMA) as a co-polymer and (ii) a similar injection moulded core of PBT with 5% EMA as a co-polymer having a silicone spray coating, in synthetic oil at 60° C. for 14 days. The theoretical maximum for the system is also shown and is based on a 20% (w/w) loading of the non-coated core.

FIG. 4 shows that the release of tracer from the coated sample is slower compared to the release from the non-coated sample. For example, at day 1 the concentration of tracer in the synthetic oil from the coated and non-coated samples was 93 and 121 ppm, respectively. The release of tracer on day 1 from the coated sample was about 78% of that from the non-coated sample. At day 6, the concentration of tracer in the synthetic oil from the coated and non-coated samples was 212 and 268 ppm, respectively. The release of tracer on day 6 from the coated sample was about 79% of that from the non-coated sample. At day 14, the concentration of tracer in the synthetic oil from the coated and non-coated samples was 291 and 414 ppm, respectively. The release of tracer on day 14 from the coated sample was about 70% of that from the non-coated sample.

Example 4. Tracer C in a Polypropylene (PP) Core Coated with Polyurethane (PUR)

500 g of solid powder of an oil soluble tracer were compounded with 4.5 kg of polypropylene (Moplen HP556E, LyndellBassell Industries) and extruded through a twin screw extruder (Prism TS24E ThermoFisher) at 240° C. The extrudate was cooled with water and then pelletized. The pellets were then dried at 110° C. for 3 h. The dried pellet materials were then injection moulded into pieces with dimensions of 125 mm long, 12.5 mm wide and 3.2 mm thick using an injection moulding machine (Boy 22S, BOYS Machines.) at 240° C.

A part of injection moulded piece made above (40 mm×5 mm×3.2 mm, 0.5201 g) was coated with polyurethane. Commercial two part polyurethane (Neukadur PN1695, ex Altroplo) was used for the coating. The coating was dip coated onto the piece and then a wooden spatula was used to ensure even coverage over the whole surface. A 1:1 mixture of polyol and isocyanate with 15% (w/w) glass bubbles (filler), were premixed at room temperature. The piece was then dip coated into the mixture and the mix spread over the surface with a wooden spatula. The piece was left to cure at room temperature for 16 hrs. The coated piece was not sticky and hard to the touch.

The coated piece (0.8704 g) and a non-coated piece (0.5201 g) were placed in individual sample bottles of synthetic oil (100 g) and heated at 60° C. Samples were shaken twice daily. Samples of the synthetic oil were taken over time and analysed with an internal standard to determine the amount of tracer released into the synthetic oil.

Figure 5:
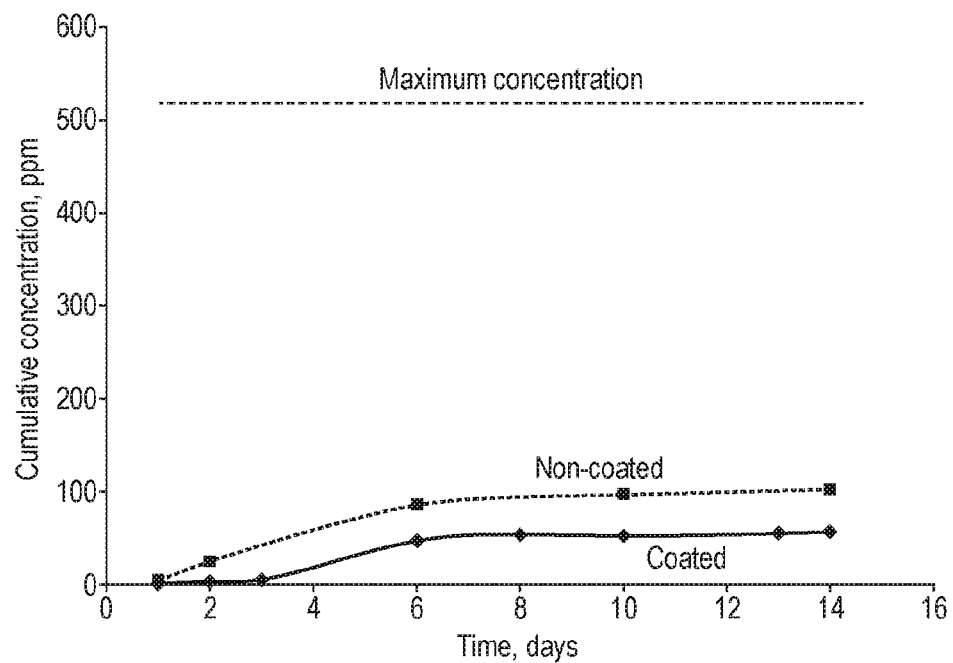
FIG. 5 is a graph showing the cumulative release of tracer C from (i) a non-coated core of an injection moulded piece having dimensions of 40 mm×5 mm×3.2 mm composed of polypropylene and (ii) a similar injection moulded core of polypropylene having a polyurethane coating, in synthetic oil at 60° C. for 14 days. The theoretical maximum for the system is also shown and is based on a 10% (w/w) loading of the non-coated core.

FIG. 5 show the release of the tracer is significantly delayed. The polyurethane coating appears to delay the initial release of tracer, with little cumulative release from day 1-3. After the initial 3 day period, the coated sample released about 55% of the amount of tracer released by the non-coated sample. For example, at day 6, the concentration of tracer in the synthetic oil from the coated and non-coated samples was 48 and 86 ppm, respectively. The release of tracer on day 6 from the coated sample was about 56% of that from the non-coated sample. At day 10, the concentration of tracer in the synthetic oil released from the coated and non-coated samples was 53 and 97 ppm, respectively. The release of tracer on day 10 from the coated sample was only about 55% of that from the non-coated sample. At day 14, the concentration of tracer in the synthetic oil from the coated and non-coated samples was 57 and 103 ppm, respectively. The release of tracer on day 14 from the coated sample was only about 55% of that from the non-coated sample.

Example 5. Tracer C in a High Density Polyethylene (HDPE) Core Coated with Polyurethane (PUR)

500 g of solid powder of an oil soluble tracer C were compounded with 4.5 kg of high density polyethylene (HE3366, Borelais) and extruded through a twin screw extruder (Prism TS24E ThermoFisher) at 240° C. The extrudate was cooled with water and then pelletized. The pellets were then dried at 110° C. for 3 h. The dried pellet materials were then injection moulded into pieces with dimensions of 125 mm long, 12.5 mm wide and 3.2 mm thick using an injection moulding machine (Boy 22S, BOYS Machines) at 240° C.

A part of injection moulded piece made above (40 mm×5 mm×3.2 mm, 0.5654 g) was coated with polyurethane. Commercial 2 part polyurethane (Neukadur PN1695, ex Altroplo) was used for the coating. The coating was dip coated onto the piece and then a wooden spatula was used to ensure even coverage over the whole surface. A 1:1 mixture of polyol and isocyanate with 15% w/w glass bubbles (filler), were premixed at room temperature. The piece was then dip coated into the mixture and the mix spread over the surface with a wooden spatula. The piece was left to cure at room temperature for 16 h. The coated piece was not sticky and the coating was hard.

The coated piece (0.9205 g) and a non-coated piece (0.5654 g) were placed into individual sample bottles of synthetic oil (100 g) and heated at 60° C. Samples were shaken twice daily. Samples of the synthetic oil were taken over time and analysed with an internal standard to determine the amount of tracer released into the synthetic oil.

Figure 6:
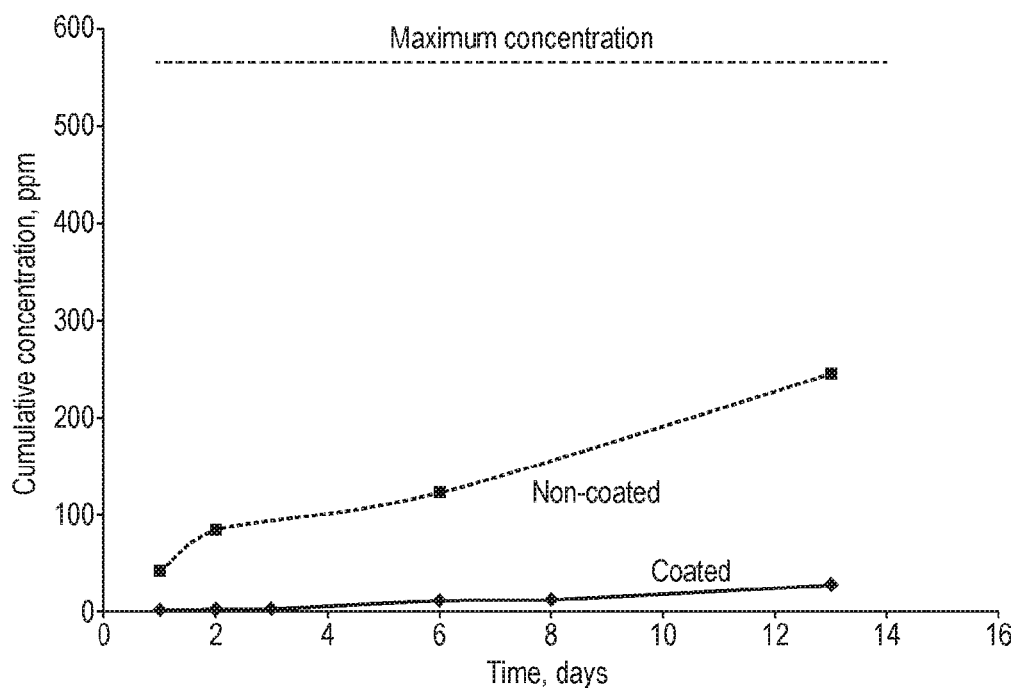
FIG. 6 is a graph showing the cumulative release of tracer C from (i) a non-coated core of an injection moulded piece having dimensions of 40 mm×5 mm×3.2 mm composed of HDPE and (ii) a similar injection moulded core of HDPE having a polyurethane coating, in synthetic oil at 60° C. for 13 days. The theoretical maximum for the system is also shown and is based on a 10% (w/w) loading of the non-coated core.

FIG. 6 shows that the release of tracer from the coated sample is significantly slowed compared to that from the non-coated sample, with the coated sample releasing only about 11% or less of the tracer compared to the amount released from the non-coated sample. For example, at day 2 the concentration of tracer in the synthetic oil from the coated and non-coated samples was 2 and 84 ppm, respectively. The release of tracer on day 2 from the coated sample was only about 2% of that from the non-coated sample. At day 6, the concentration of tracer in the synthetic oil from the coated and non-coated samples was 12 and 123 ppm, respectively. The release of tracer on day 6 from the coated sample was about 10% of that from the non-coated sample. At day 13, the concentration of tracer in the synthetic oil from the coated and non-coated samples was 28 and 246 ppm, respectively. The release of tracer on day 13 from the coated sample was only about 11% of that from the non-coated sample.

Example 6. Tracer in a High Density Polyethylene (HDPE) and Ethylene-Methacrylate as a Co-Polymer (EMA) Core Coated with Polyurethane (PUR)

500 g of solid powder of an oil soluble tracer C, 1.875 kg of high density polyethylene (HE3366, ex-Borelais) and 0.125 kg ethyl methacrylate copolymer (Lotryl 20 MA08, Arkema) were compounded and extruded through a twin screw extruder (Prism TS24E ThermoFisher) at 240° C. The extrudate was cooled with water and then pelletized. The pellets were then dried at 110° C. for 3 h. The dried pellet materials were then injection moulded into pieces with dimensions of 125 mm long, 12.5 mm wide and 3.2 mm thick using an injection moulding machine (Boy 22S, BOYS Machines) at 240° C.

A part of injection moulded piece made above (40 mm×5 mm×3.2 mm, 0.5239 g) was coated with polyurethane. Commercial 2 part polyurethane (Neukadur PN1695, Altroplo) was used for the coating. The coating was dip coated onto the piece and then a wooden spatula was used to ensure even coverage over the whole surface. A 1:1 mixture of polyol and isocyanate with 15% (w/w) glass bubbles (filler), were premixed at room temperature. The piece was then dip coated into the mixture and the mixture was spread over the surface with a wooden spatula. The piece was left to cure at room temperature for 16 h. The coated piece was not sticky and the coating was hard.

The coated piece (0.9172 g) and a non-coated piece (0.5239 g) were placed in individual sample bottles of synthetic oil (100 g) and heated at 60° C. Samples were shaken twice daily. Samples of the synthetic oil were taken over time and analysed with an internal standard to determine the amount of tracer released into the synthetic oil.

Figure 7:
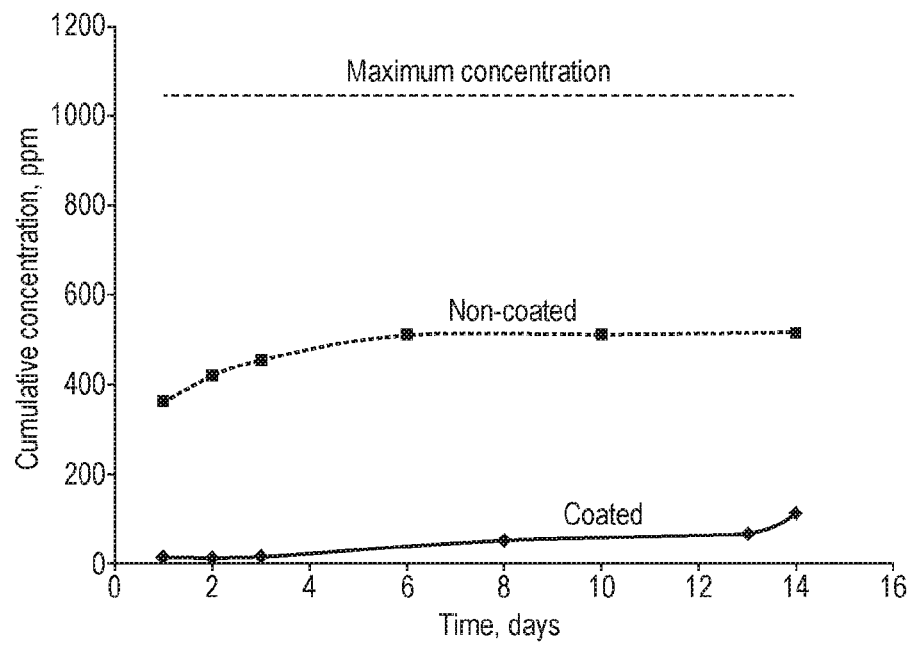
FIG. 7 is a graph showing the cumulative release of tracer B from (i) a non-coated core of an injection moulded piece having dimensions of 40 mm×5 mm×3.2 mm composed of HDPE with 5% EMA as a co-polymer and (ii) a similar injection moulded core of HDPE with 5% EMA as a co-polymer having a polyurethane coating, in synthetic oil at 60° C., for 14 days. The theoretical maximum for the system is also shown and is based on a 20% (w/w) loading of the non-coated core.

FIG. 7 shows that the release of tracer from the coated sample is significantly slowed compared to that from the non-coated sample, with the coated samples releasing only about 22% or less of the amount of tracer compared to the amount released from the non-coated sample. For example, at day 1 the concentration of tracer in the synthetic oil from the coated and non-coated samples was 15 and 362 ppm, respectively. The release of tracer on day 1 from the coated sample was only about 4% of that from the non-coated sample. At day 3 the concentration of tracer in the synthetic oil from the coated and non-coated samples was 17 and 456 ppm, respectively. The release of tracer on day 3 from the coated sample was only about 4% of that from the non-coated sample. At day 8, the concentration of tracer in the synthetic oil from the coated and non-coated samples was 53 and 511 ppm, respectively. The release of tracer on day 8 from the coated sample was about 10% of that from the non-coated sample. At day 14, the concentration of tracer in the synthetic oil from the coated and non-coated samples was 110 and 517 ppm, respectively. The release of tracer on day 13 from the coated sample was only about 22% or less of that from the non-coated sample.

Example 7. Tracer D in a Cylindrical Shaped Epoxy Core Coated with Epoxy

Tracer D was placed into an epoxy system such that the final concentration of tracer was approximately 45.45% (w/w) of tracer. Several epoxy pieces were cast into a cylindrical shape (h=15 mm, ø=6 mm). These would be the non-coated samples and would also be the core of the coated samples. To some of these cores the same epoxy resin was used to coat these such that the amount of the coating was approximately 18.5% of the total weight of the final composition.

The coated piece (0.7491 g) and a non-coated piece (0.6187 g) were placed into individual sample bottles of synthetic oil (200 g) and heated at 60° C. Samples were stirred using a magnetic stir bar. Samples of the synthetic oil were taken over time and analysed with an internal standard to determine the amount of tracer released into the synthetic oil.

Figure 8:
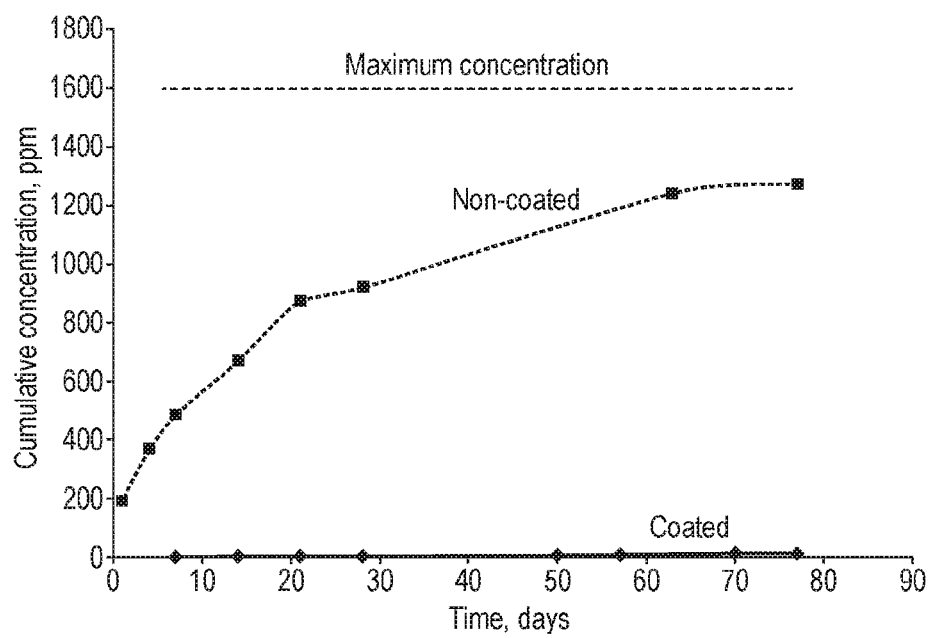
FIG. 8 is a graph showing the cumulative release of tracer D released from (i) a non-coated epoxy core moulded into a cylindrical shape (h=15 mm, ⌀=6 mm) and (ii) a similar moulded epoxy core having an epoxy coating equating to 17.4% (w/w) of the total weight of the composition, in synthetic oil at 95° C. for 77 days. The theoretical maximum for the system is also shown and is based on a 45.45% (w/w) loading of the non-coated core.

FIG. 8 shows a graph of the cumulative concentration of tracer released from the non-coated cylinder and the coated cylinder. At day 77, the cumulative concentration of tracer from the non-coated system was about 1275 ppm, with a theoretical maximum concentration of 1612 ppm. The amount of tracer released was about 79% of the amount of the total tracer applied. At day 77, the cumulative concentration of tracer from the coated system was about 16 ppm. The core of the coated piece had a similar mass to the non-coated piece described above; therefore the theoretical maximum concentration is about 1612 ppm. The amount of tracer released from the coated system was less than 1% of the amount of the total tracer applied.

Figure 9:
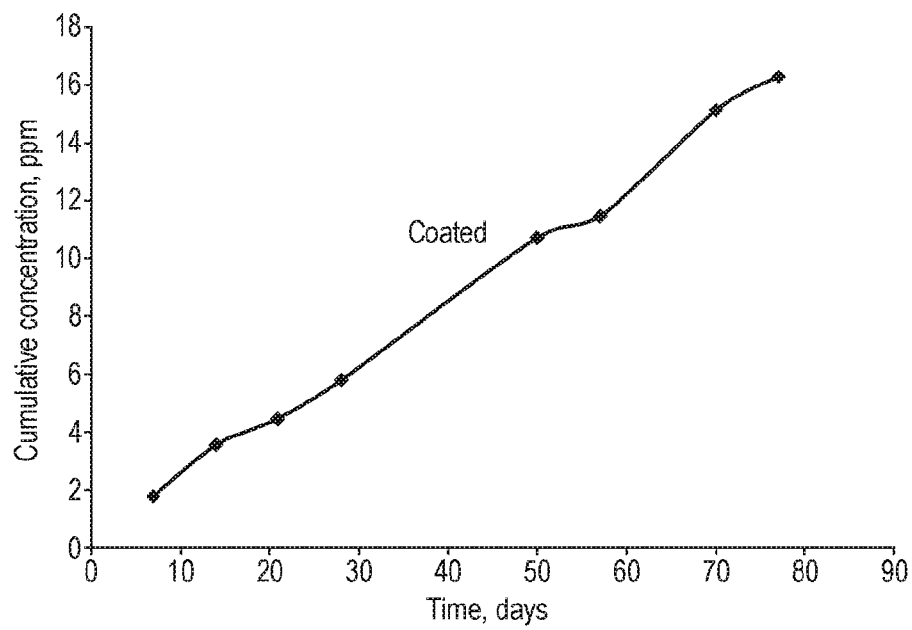
FIG. 9 is an expanded graph showing the cumulative release of tracer D released from the same coated test piece described in FIG. 8.

FIG. 9 shows an expanded graph of the cumulative concentration from the same coated sample from FIG. 8.

Example 8. Tracer D in a Cube Shaped Epoxy Core Coated with Epoxy

Tracer D was placed into an epoxy system such that the final concentration of tracer was approximately 45.45% (w/w) of tracer. Several epoxy pieces were cast into a cube shapes (l=15 mm). These would be the non-coated samples and would also be the core of the coated samples. To some of these cores the same epoxy resin was used to coat these such that the amount of the coating was approximately 17.4% of the total weight of the final composition.

The coated piece (6.0735 g) and a non-coated piece (4.9706 g) were placed into individual sample bottles of synthetic oil (200 g) and heated at 60° C. Samples were stirred using a magnetic stir bar. Samples of the synthetic oil were taken over time and analysed with an internal standard to determine the amount of tracer released into the synthetic oil.

Figure 10:
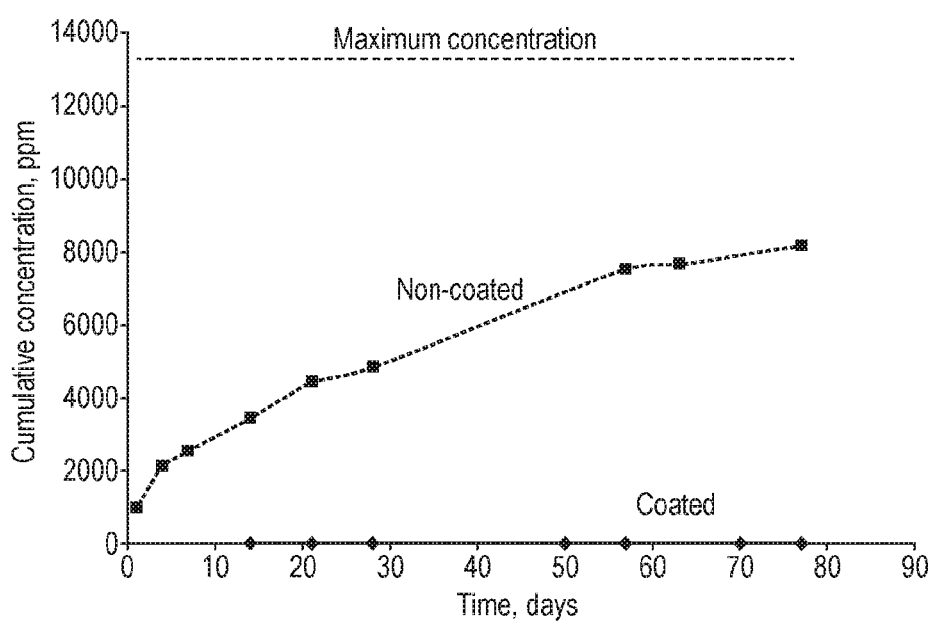
FIG. 10 is a graph showing the cumulative release of tracer D released from (i) a non-coated epoxy core moulded into a cube shape (l=15 mm) and (ii) a similar moulded epoxy core having an epoxy coating equating to 18.5% (w/w) of the total weight of the composition, in synthetic oil at 95° C. for 77 days. The theoretical maximum for the system is also shown and is based on a 45.45% (w/w) loading of the non-coated core.

FIG. 10 shows a graph of the cumulative concentration of tracer released from the non-coated cube and the coated cube. At day 77, the cumulative concentration of tracer from the non-coated system was about 8165 ppm, with a theoretical maximum concentration of 13285 ppm. The amount of tracer released was about 61% of the amount of the total tracer applied. At day 77, the cumulative concentration of tracer from the coated system was about 4 ppm. The core of the coated piece had a similar mass to the non-coated piece described above; therefore the theoretical maximum concentration is about 13285 ppm. The amount of tracer released from the coated system was less than 0.04% of the amount of the total tracer applied.

Figure 11:
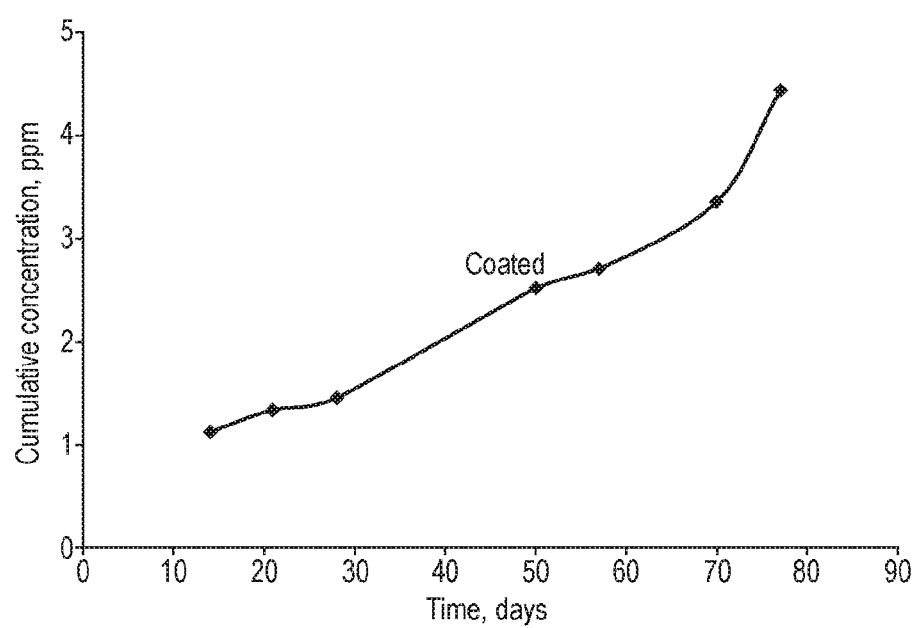
FIG. 11 is an expanded graph showing the cumulative release of tracer D released from the same coated test piece described in FIG. 10.

FIG. 11 shows an expanded graph of the cumulative concentration from the same coated sample from FIG. 10.

Although the invention is illustrated and described herein with reference to specific aspects of the invention, the invention is not intended to be limited to the details shown. Rather, various modifications may be made in the details within the scope and range of equivalents of the claims and without departing from the invention.

What is claimed is:

1. An article comprising: (a) a core and (b) a coating that covers at least part of the core, where the core comprises a mixture of at least one oil field chemical and at least one core matrix and the article provides a controlled release of the oil field chemical into an eluent that is less than a comparable article not having a coating on the core, over a period of at least 14 days under test conditions simulating an oil field reservoir using an eluent representative of fluid in a hydrocarbon reservoir at a temperature of at least 60° C., wherein the article formed by the core and the coating is an elongate article having a length greater than 150 mm; and the article being configured for attachment to a pipe, a fitting, or other well completion apparatus such that the pipe, fitting or other well completion apparatus is insertable into the hydrocarbon reservoir with the article attached, wherein the core and coating are selected such that the oil field chemical is released from the article into the eluent via diffusion of the oilfield chemical through the core and the coating when the article is contacted with the eluent, and wherein the coating is selected to retain its structure and not be removed in use.

2. The article of claim 1, where the article provides a release of the oil field chemical into an eluent that is less than a comparable article not having a coating on the core, over a period of 3 months under conditions simulating that found in a hydrocarbon reservoir.

3. The article of claim 1, where the amount of the oil field chemical in the core is ≥20%, based on the total weight of the article.

4. The article of claim 1, where the coating covers ≥50% of the surface area of the core.

5. The article of claim 1, where the core comprises at least one of a product of the reaction of an epoxy with a hardener, an acrylate, a polyester, a polyolefin (linear and crosslinked) a polyurethane, polybutylene terephthalate (PBT), a polypropylene, a highly cross-linked polyethylene, a polyvinyl chloride (PVC), a nylon, polyvinylidene difluoride (PVDF), polytetrafluoroethylene (PTFE), a polyoxymethylene (POM), an acrylonitrile butadiene styrene (ABS), a polystyrene, a polycarbonate, polyethylene terephthalate (PET), a polychlorotrifluoroethene (PTFCE), a polysulfone, a polyimide, a polyamide, a melamine formaldehyde, a cyanoacrylate, polyphenylene sulfide (PPPS), polypropylene oxide, phenyl formaldehyde Bakelite, a fluorinated ethylene propylene (FEP), a perfluoroalkoxy alkane (PFA), ethylene tetrafluoroethylene (ETFE), or a poly(fluoroethylene-vinyl ether) (PFEVE).

6. The article of claim 1, where the core matrix is a thermosetting polymer, a blend of a thermosetting polymer with one or more additional thermosetting polymers, a thermoplastic polymer, a blend of one or more thermoplastic polymers with one or more thermosetting polymers, an elastomer, a wax, a binding agent, a rubber or a natural polymer.

7. The article of claim 1, where the article provides a release of the oil field chemical into an eluent that is 80% or less than a comparable article not having a coating on the core.

8. The article of claim 1, where the core is formed from a plurality of shaped pieces.

9. The article of claim 8, where the shaped pieces are fibers, cuboids, balls, cuttings, nets, blocks, a film or a microencapsulated material.

10. The article of claim 1, where the article further comprises carbon fibre and/or nano/micro particulates.

11. The article of claim 1, where the coating further comprises carbon fibre and/or nano/micro particulates.

12. The article of claim 1, where the core comprises a first matrix and the coating comprises a second matrix and the first matrix is different than the second matrix.

13. The article of claim 1, where the oil field chemical is a tracer or a well treatment agent.

14. The article of claim 1, wherein the oil field chemical is in the form of a plurality of particles disposed within the core.

15. The article of claim 14, wherein each of the plurality of particles comprises an oil field chemical surrounded by an encapsulation layer.

16. The article of claim 1, wherein the core and the coating are bound to one another.

17. A method of determining the movement of a fluid or gas in a subterranean reservoir comprising the steps of placing an article of claim 1 within a well penetrating the reservoir, thereafter collecting a sample of the fluid or gas being produced from the well and analysing the sample to determine at least one of the presence or absence of the at least one oil field chemical; and determining the concentration of one or more oil field chemicals in fluids flowing from the well.

18. The method according to claim 17, further comprising taking a plurality of samples of fluid or gas flowing from the well over a period of time and determining the concentrations of one or more oil field chemicals in the fluid or gas over the same period of time.

* * * * *